US012647748B2

(12) United States Patent
Schnitzler et al.

(10) Patent No.: US 12,647,748 B2
(45) Date of Patent: Jun. 2, 2026

(54) METHODS, APPARATUSES AND SYSTEMS DIRECTED TO QUALITY OF EXPERIENCE DATA ANALYTICS FOR MULTIPLE WIRELESS TRANSMIT AND RECEIVE UNITS

(71) Applicant: InterDigital Patent Holdings, Inc., Wilmington, DE (US)

(72) Inventors: Francois Schnitzler, Saint Ave (FR); Christopher Howson, Corps-Nuds (FR); Stephane Onno, Saint Gregoire (FR); Christoph Neumann, Rennes (FR)

(73) Assignee: InterDigital Patent Holdings, Inc., Wilmington, DE (US)

( * ) Notice: Subject to any disclaimer, the term of this patent is extended or adjusted under 35 U.S.C. 154(b) by 733 days.

(21) Appl. No.: 17/766,021

(22) PCT Filed: Sep. 25, 2020

(86) PCT No.: PCT/EP2020/076971
§ 371 (c)(1),
(2) Date: Apr. 1, 2022

(87) PCT Pub. No.: WO2021/063840
PCT Pub. Date: Apr. 8, 2021

(65) Prior Publication Data
US 2022/0417799 A1 Dec. 29, 2022

(30) Foreign Application Priority Data

Oct. 3, 2019 (EP) ..................................... 19306274
Aug. 11, 2020 (EP) ..................................... 20305924

(51) Int. Cl.
*H04W 4/00* (2018.01)
*H04L 41/5019* (2022.01)
(Continued)

(52) U.S. Cl.
CPC ........... *H04W 4/00* (2013.01); *H04L 41/5019* (2013.01); *H04L 43/08* (2013.01); *H04W 4/60* (2018.02); *H04W 28/24* (2013.01)

(58) Field of Classification Search
None
See application file for complete search history.

(56) References Cited

U.S. PATENT DOCUMENTS

2013/0159498 A1* 6/2013 Funge .............. H04N 21/44218
709/224
2015/0044989 A1 2/2015 De Foy et al.
(Continued)

FOREIGN PATENT DOCUMENTS

CN 102138361 A 7/2011
CN 104868986 A 8/2015
(Continued)

OTHER PUBLICATIONS

3GPP "TS 23.288 NWDAF-assisted QoS profile provision", Jan. 2019, S2-1900533, pp. 1-4.*
(Continued)

*Primary Examiner* — Adnan Baig
(74) *Attorney, Agent, or Firm* — VOLPE KOENIG

(57) ABSTRACT

Methods, apparatuses, systems, etc., directed to quality of experience (QoE) data analytics for multiple wireless transmit and receive units (WTRUs) in 5G networks are disclosed herein. In an embodiment, a method may comprise receiving a request message requesting a quality of service (QoS) configuration related to at least one WTRU involved in an application for obtaining a target QoE of the application. The first method may further comprise transmitting the QoS configuration obtained based on the target QoE. In an embodiment, a method may comprise transmitting a first request signal for subscribing to a service data from an application and receiving a first response signal comprising (Continued)

at least one identifier of at least one WTRU involved in the application, the first response signal may comprise at least one indication of at least one individual contribution of the at least one WTRU to a QoE of the application.

16 Claims, 13 Drawing Sheets

(51) Int. Cl.
  *H04L 43/08*    (2022.01)
  *H04W 4/60*    (2018.01)
  *H04W 28/24*   (2009.01)

(56) References Cited

U.S. PATENT DOCUMENTS

| | | | |
|---|---|---|---|
| 2016/0105821 A1 | 4/2016 | Senarath et al. | |
| 2016/0227564 A1 | 8/2016 | Stephenne et al. | |
| 2016/0248835 A1* | 8/2016 | Petrangeli | H04L 65/65 |
| 2017/0186019 A1 | 6/2017 | Loeb et al. | |
| 2017/0332282 A1 | 11/2017 | Dao | |
| 2018/0262924 A1* | 9/2018 | Dao | H04W 72/535 |
| 2018/0302832 A1* | 10/2018 | Huang | H04W 36/0044 |
| 2021/0014141 A1* | 1/2021 | Patil | H04W 76/25 |
| 2021/0250251 A1* | 8/2021 | Fan | H04L 41/0816 |
| 2021/0250785 A1* | 8/2021 | Örtenblad | H04W 24/02 |
| 2021/0329485 A1* | 10/2021 | Han | H04W 28/0215 |
| 2021/0337555 A1* | 10/2021 | Fan | H04L 41/40 |
| 2021/0342687 A1* | 11/2021 | Wang | G06N 3/08 |

FOREIGN PATENT DOCUMENTS

| | | |
|---|---|---|
| CN | 108353310 A | 7/2018 |
| CN | 108574965 A | 9/2018 |
| CN | 108886803 A | 11/2018 |
| CN | 109075952 A | 12/2018 |
| CN | 109804569 A | 5/2019 |
| CN | 110169034 A | 8/2019 |

OTHER PUBLICATIONS

Anonymous, "TS 23.288 NWDAF-assisted Qos profile provision", The 3rd Generation Partnership Project (3GPP), 3GPP TSG-SA WG2, Document: S2-1900533, Meeting #130, Kochi, India, Jan. 21, 2019, 4 pages.

Anonymous, "Architecture enhancements for 5G System (5GS) to support network data analytics services (Release 16)", The 3rd Generation Partnership Project (3GPP), Technical Specification Group Services and System Aspects, Document: 3GPP TS 23.288 V1.0.0, May 2019, 52 pages.

Schmidt et al., "First Draft for an Opinion Model Predicting Gaming QoE (G.OMG)", International Telecommunication Union, Telecommunication Standardization Sector, Study Group 12, Document: SG12-C.387, Geneva, Switzerland, May 7, 2019, 21 pages.

English Translation of CN108574965A, entitled: Method and Device for Performing Request Processing, Sep. 25, 2018, 20 pages.

Ericsson et al., "OAM and AF as Consumer of Analytics," SA WG2 Meeting #133, S2-1906793, Reno, Nevada, USA (May 13-17, 2019).

Ericsson et al., "OAM and AF as consumer of analytics," 3GPP Draft, S2-1906793, e-mail revision 5 of S2-1906766, vol. SA WG2 Meeting #133, May 13-17, 2019, Reno, Nevada, USA / May 13, 2019.

"3rd Generation Partnership Project; Technical Specification Group Services and System Aspects; Procedures for the 5G System (5GS); Stage 2 (Release 16)," 3GPP TS 23.502 V16.2.0 (Sep. 2019); 525 pages.

"3rd Generation Partnership Project; Technical Specification Group Radio Access Network; NR; Physical layer measurements, (Release 15)", 3rd Generation Partnership Project, 3GPP TS 38.215 V15.5.0, Jun. 2019, 16 pages.

3rd Generation Partnership Project, Technical Specification Group Radio Access Network; Evolved Universal Terrestrial Radio Access (E-UTRA); Radio Resource Control (RRC); Protocol specification (Release 15) », 3GPP TS 36.331 V15.7.0, Sep. 2019, 962 pages.

ITU-T Recommendation P.1203.3: "Parametric bitstream-based quality assessment of progressive download and adaptive audiovisual streaming services over reliable transport—Quality integration module"(Jan. 2019).

"3rd Generation Partnership Project; Technical Specification Group Services and System Aspects; Telecommunication management; Quality of Experience (QoE) measurement collection; Concepts, use cases and requirements (Release 16)", 3GPP TS 28.404 V16.0.0 (Sep. 2019), 12 pages.

"3rd Generation Partnership Project; Technical Specification Group Services and System Aspects; Telecommunication management; Quality of Experience (QoE) measurement collection Integration Reference Point (IRP); Requirements (Release 15)", 3GPP TS 28.307 V0.2.0 (Jan. 2019), 11 pages.

"3rd Generation Partnership Project; Technical Specification Group Radio Access Network; NR; Radio Resource Control (RRC) protocol specification (Release 15)," 3GPP TS 38.331 V15.7.0 (Sep. 2019), 527 pages.

"3rd Generation Partnership Project; Technical Specification Group Services and System Aspects; QoE parameters and metrics relevant to the Virtual Reality (VR) user experience (Release 16)", 3GPP TR 26.929 V16.1.0 (Sep. 2019), 37 pages.

Ericsson LM et al., "New WID on VR QoE metrics", TSG SA Meeting #84, TD SP-190331, Newport Beach, USA, Jun. 5-7, 2019, 3GPP™ Work Item Description, 3 pages.

* cited by examiner

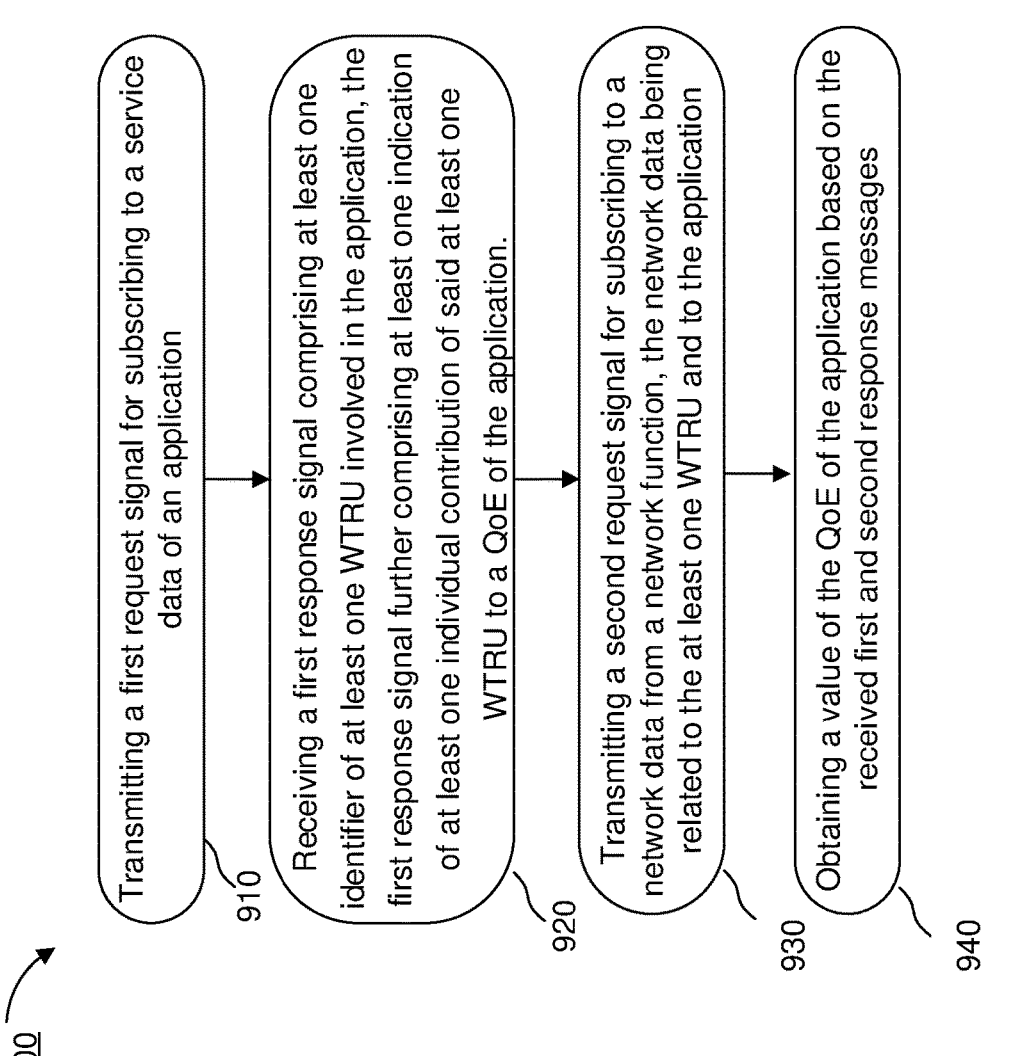

Transmitting a first request signal for subscribing to a service data of an application

910

Receiving a first response signal comprising at least one identifier of at least one WTRU involved in the application, the first response signal further comprising at least one indication of at least one individual contribution of said at least one WTRU to a QoE of the application.

920

Transmitting a second request signal for subscribing to a network data from a network function, the network data being related to the at least one WTRU and to the application

930

Obtaining a value of the QoE of the application based on the received first and second response messages

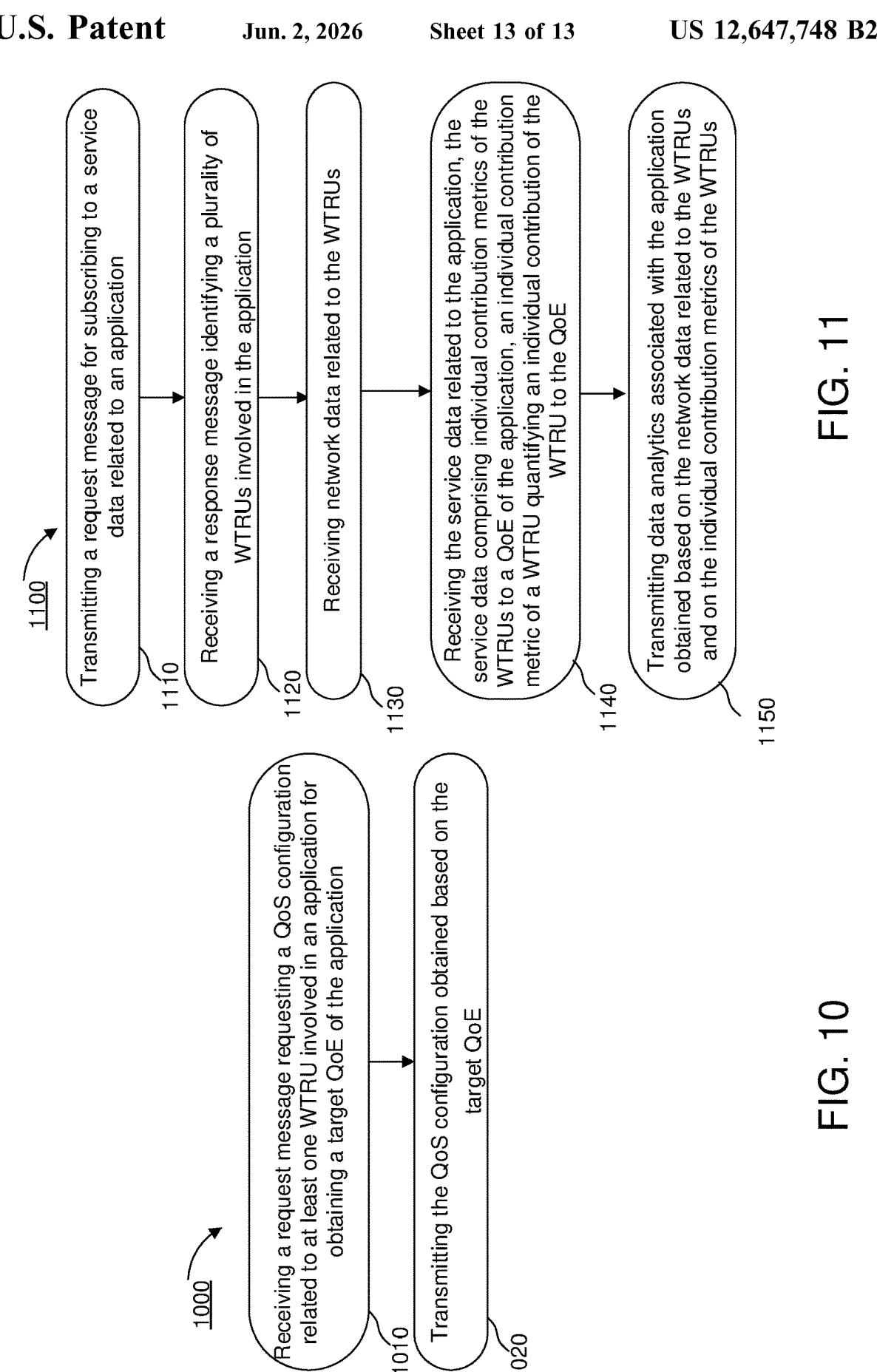

Transmitting a request message for subscribing to a service data related to an application    1110

Receiving a response message identifying a plurality of WTRUs involved in the application    1120

Receiving network data related to the WTRUs    1130

Receiving the service data related to the application, the service data comprising individual contribution metrics of the WTRUs to a QoE of the application, an individual contribution metric of a WTRU quantifying an individual contribution of the WTRU to the QoE    1140

Transmitting data analytics associated with the application obtained based on the network data related to the WTRUs and on the individual contribution metrics of the WTRUs    1150

Receiving a request message requesting a QoS configuration related to at least one WTRU involved in an application for obtaining a target QoE of the application    1010

Transmitting the QoS configuration obtained based on the target QoE    1020

METHODS, APPARATUSES AND SYSTEMS DIRECTED TO QUALITY OF EXPERIENCE DATA ANALYTICS FOR MULTIPLE WIRELESS TRANSMIT AND RECEIVE UNITS

CROSS REFERENCE TO RELATED APPLICATIONS

This application is a U.S. National Stage Application under 35 U.S.C. 371 of International Patent Application No. PCT/EP2020/076971, filed Sep. 25, 2020, which is incorporated herein by reference in its entirety.

This application claims the benefit of European Patent Applications Nos. 19306274.2, filed Oct. 3, 2019; and 20305924.1, filed Aug. 11, 2020, each of which is incorporated herein by reference in its entirety.

BACKGROUND

The present disclosure relates to network communications, including, but not exclusively, methods, apparatuses, systems, etc. directed to perform network data analytics in 5G networks.

A Network Data Analytics Function (NWDAF) may interact with different entities for different purposes. A NWDAF may, for example, collect data from various data providing entities, such as, for example, Network Functions (NF), and provide analytics on demand to consumer entities. NWDAF may be seen as a general mechanism for providing access to analytics services. Analytics information may be any of statistical information on past events and predictive information for a future period.

SUMMARY

Methods, apparatuses, systems, etc., directed to quality of experience (QoE) data analytics for (e.g., multiple) wireless transmit and receive units (WTRU(s)) in 5G networks are disclosed herein. In an embodiment, a first method may comprise receiving a request message requesting a quality of service (QoS) configuration related to at least one WTRU involved in an application for obtaining a target QoE of the application. The first method may further comprise transmitting the QoS configuration obtained based on the target QoE. In an embodiment, a second method may comprise receiving a request signal for subscribing to a service data from an application and transmitting a response signal comprising at least one identifier of at least one WTRU involved in the application, the response signal further comprising at least one indication of an individual contribution of the at least one WTRU to a QoE of the application. In an embodiment, a third method may comprise transmitting a first request signal for subscribing to a service data from an application and receiving a first response signal comprising at least one identifier of at least one WTRU involved in the application, the first response signal may comprise at least one indication of at least one individual contribution of the at least one WTRU to a QoE of the application. The third method may comprise transmitting a second request signal for subscribing to a network data from a network function, the network data being related to the at least one WTRU and to the application. The third method may comprise receiving a second response signal comprising the network data related to the at least one WTRU and to the application. A data analytics (such as e.g., a value of the QoE) of the application may be obtained based on the received first and second response messages.

Although various embodiments are described and/or claimed herein in which an apparatus, system, device, etc. and/or any element thereof is configured to carry out an operation, process, algorithm, function, etc. and/or any portion thereof, it is to be understood that any embodiments described and/or claimed herein assume that any apparatus, system, device, etc. and/or any element thereof carries out any operation, process, algorithm, function, etc. and/or any portion thereof (and vice versa).

BRIEF DESCRIPTION OF THE DRAWINGS

A more detailed understanding may be had from the following description, given by way of example in conjunction with the accompanying drawings. Figures in such drawings, like the detailed description, are examples. As such, the Figures and the detailed description are not to be considered limiting, and other equally effective examples are possible and likely. Furthermore, like reference numerals in the figures indicate like elements.

FIG. 1C is a system diagram illustrating an example radio access network (RAN) and an example core network (CN) that may be used within the communications system illustrated in FIG. 1A according to an embodiment;

FIG. 1D is a system diagram illustrating a further example RAN and a further example CN that may be used within the communications system illustrated in FIG. 1A according to an embodiment;

FIG. 9 is a diagram illustrating an example of a method for obtaining a QoE value;

FIG. 10 is a diagram illustrating an example of a method for obtaining a QoS configuration;

FIG. 11 is a diagram illustrating an example of a method for obtaining a data analytics.

DETAILED DESCRIPTION

A detailed description of illustrative embodiments will now be described with reference to the various Figures. Although this description provides a detailed example of possible implementations, it should be noted that the details are intended to be exemplary and in no way limit the scope of the application. In the following detailed description, numerous specific details are set forth to provide a thorough understanding of embodiments and/or examples disclosed herein. However, it will be understood that such embodiments and examples may be practiced without some or all of the specific details set forth herein. In other instances, well-known methods, procedures, components and circuits have not been described in detail, so as not to obscure the following description. Further, embodiments and examples not specifically described herein may be practiced in lieu of, or in combination with, the embodiments and other examples described, disclosed or otherwise provided explicitly, implicitly and/or inherently (collectively "provided") herein.

Example Communications Networks

Figure 1A:
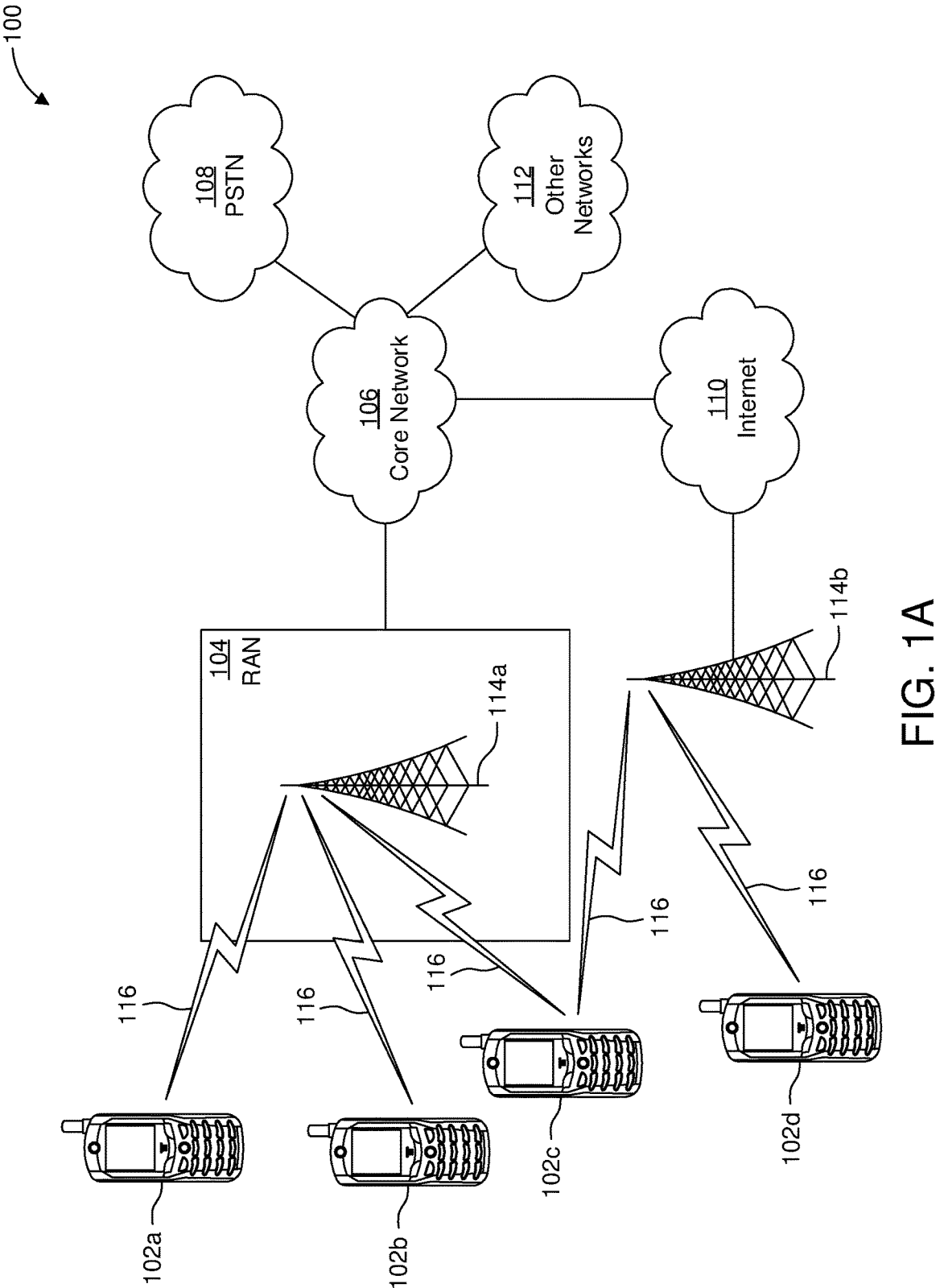
FIG. 1A is a system diagram illustrating an example communications system in which one or more disclosed embodiments may be implemented.

FIG. 1A is a diagram illustrating an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), zero-tail unique-word DFT-Spread OFDM (ZT UW DTS-s OFDM), unique word OFDM (UW-OFDM), resource block-filtered OFDM, filter bank multicarrier (FBMC), and the like.

As shown in FIG. 1A, the communications system 100 may include wireless transmit/receive units (WTRUs) 102a, 102b, 102c, 102d, a RAN 104/113, a CN 106/115, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d, any of which may be referred to as a "station" and/or a "STA", may be configured to transmit and/or receive wireless signals and may include a user equipment (UE), a mobile station, a fixed or mobile subscriber unit, a subscription-based unit, a pager, a cellular telephone, a personal digital assistant (PDA), a smartphone, a laptop, a netbook, a personal computer, a wireless sensor, a hotspot or Mi-Fi device, an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. Any of the WTRUs 102a, 102b, 102c and 102d may be interchangeably referred to as a UE.

The communications systems 100 may also include a base station 114a and/or a base station 114b. Each of the base stations 114a, 114b may be any type of device configured to wirelessly interface with at least one of the WTRUs 102a, 102b, 102c, 102d to facilitate access to one or more communication networks, such as the CN 106/115, the Internet 110, and/or the other networks 112. By way of example, the base stations 114a, 114b may be a base transceiver station (BTS), a Node-B, an eNode B, a Home Node B, a Home eNode B, a gNB, a NR NodeB, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104/113, which may also include other base stations and/or network elements (not shown), such as a base station controller (BSC), a radio network controller (RNC), relay nodes, etc. The base station 114a and/or the base station 114b may be configured to transmit and/or receive wireless signals on one or more carrier frequencies, which may be referred to as a cell (not shown). These frequencies may be in licensed spectrum, unlicensed spectrum, or a combination of licensed and unlicensed spectrum. A cell may provide coverage for a wireless service to a specific geographical area that may be relatively fixed or that may change over time. The cell may further be divided into cell sectors. For example, the cell associated with the base station 114a may be divided into three sectors. Thus, in one embodiment, the base station 114a may include three transceivers, i.e., one for each sector of the cell. In an embodiment, the base station 114a may employ multiple-input multiple output (MIMO) technology and may utilize multiple transceivers for each sector of the cell. For example, beamforming may be used to transmit and/or receive signals in desired spatial directions.

The base stations 114a, 114b may communicate with one or more of the WTRUs 102a, 102b, 102c, 102d over an air interface 116, which may be any suitable wireless communication link (e.g., radio frequency (RF), microwave, centimeter wave, micrometer wave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104/113 and the WTRUs 102a, 102b, 102c may implement a radio technology such as Universal Mobile Telecommunications System (UMTS) Terrestrial Radio Access (UTRA), which may establish the air interface 115/116/117 using wideband CDMA (WCDMA). WCDMA may include communication protocols such as High-Speed Packet Access (HSPA) and/or Evolved HSPA (HSPA+). HSPA may include High-Speed Downlink (DL) Packet Access (HSDPA) and/or High-Speed UL Packet Access (HSUPA).

In an embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A) and/or LTE-Advanced Pro (LTE-A Pro).

In an embodiment, the base station 114a and the WTRUs 102a, 102b, 102c may implement a radio technology such as NR Radio Access, which may establish the air interface 116 using New Radio (NR).

In an embodiment, the base station 114a and the WTRUs 102a, 102b, 102c may implement multiple radio access technologies. For example, the base station 114a and the WTRUs 102a, 102b, 102c may implement LTE radio access and NR radio access together, for instance using dual connectivity (DC) principles. Thus, the air interface utilized by WTRUs 102a, 102b, 102c may be characterized by multiple types of radio access technologies and/or transmissions sent to/from multiple types of base stations (e.g., an eNB and a gNB).

In other embodiments, the base station 114a and the WTRUs 102a, 102b, 102c may implement radio technologies such as IEEE 802.11 (i.e., Wireless Fidelity (WiFi), IEEE 802.16 (i.e., Worldwide Interoperability for Microwave Access (WiMAX)), CDMA2000, CDMA2000 1×, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, an industrial facility, an air corridor (e.g., for use by drones), a roadway, and the like. In one embodiment, the base station 114b and the WTRUs 102c, 102d may implement a radio technology such as IEEE 802.11 to establish a wireless local area network (WLAN). In an embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, LTE-A Pro, NR etc.) to establish a picocell or femtocell. As shown in FIG. 1A, the base station 114b may have a direct connection to the Internet 110. Thus, the base station 114b may not be required to access the Internet 110 via the CN 106/115.

The RAN 104/113 may be in communication with the CN 106/115, which may be any type of network configured to provide voice, data, applications, and/or voice over internet protocol (VoIP) services to one or more of the WTRUs 102a, 102b, 102c, 102d. The data may have varying quality of service (QoS) requirements, such as differing throughput requirements, latency requirements, error tolerance requirements, reliability requirements, data throughput requirements, mobility requirements, and the like. The CN 106/115 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104/113 and/or the CN 106/115 may be in direct or indirect communication with other RANs that employ the same RAT as the RAN 104/113 or a different RAT. For example, in addition to being connected to the RAN 104/113, which may be utilizing a NR radio technology, the CN 106/115 may also be in communication with another RAN (not shown) employing a GSM, UMTS, CDMA 2000, WiMAX, E-UTRA, or WiFi radio technology.

The CN 106/115 may also serve as a gateway for the WTRUs 102a, 102b, 102c, 102d to access the PSTN 108, the Internet 110, and/or the other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and/or the internet protocol (IP) in the TCP/IP internet protocol suite. The networks 112 may include wired and/or wireless communications networks owned and/or operated by other service providers. For example, the networks 112 may include another CN connected to one or more RANs, which may employ the same RAT as the RAN 104/113 or a different RAT.

Some or all of the WTRUs 102a, 102b, 102c, 102d in the communications system 100 may include multi-mode capabilities (e.g., the WTRUs 102a, 102b, 102c, 102d may include multiple transceivers for communicating with different wireless networks over different wireless links). For example, the WTRU 102c shown in FIG. 1A may be configured to communicate with the base station 114a, which may employ a cellular-based radio technology, and with the base station 114b, which may employ an IEEE 802 radio technology.

Figure 1B:
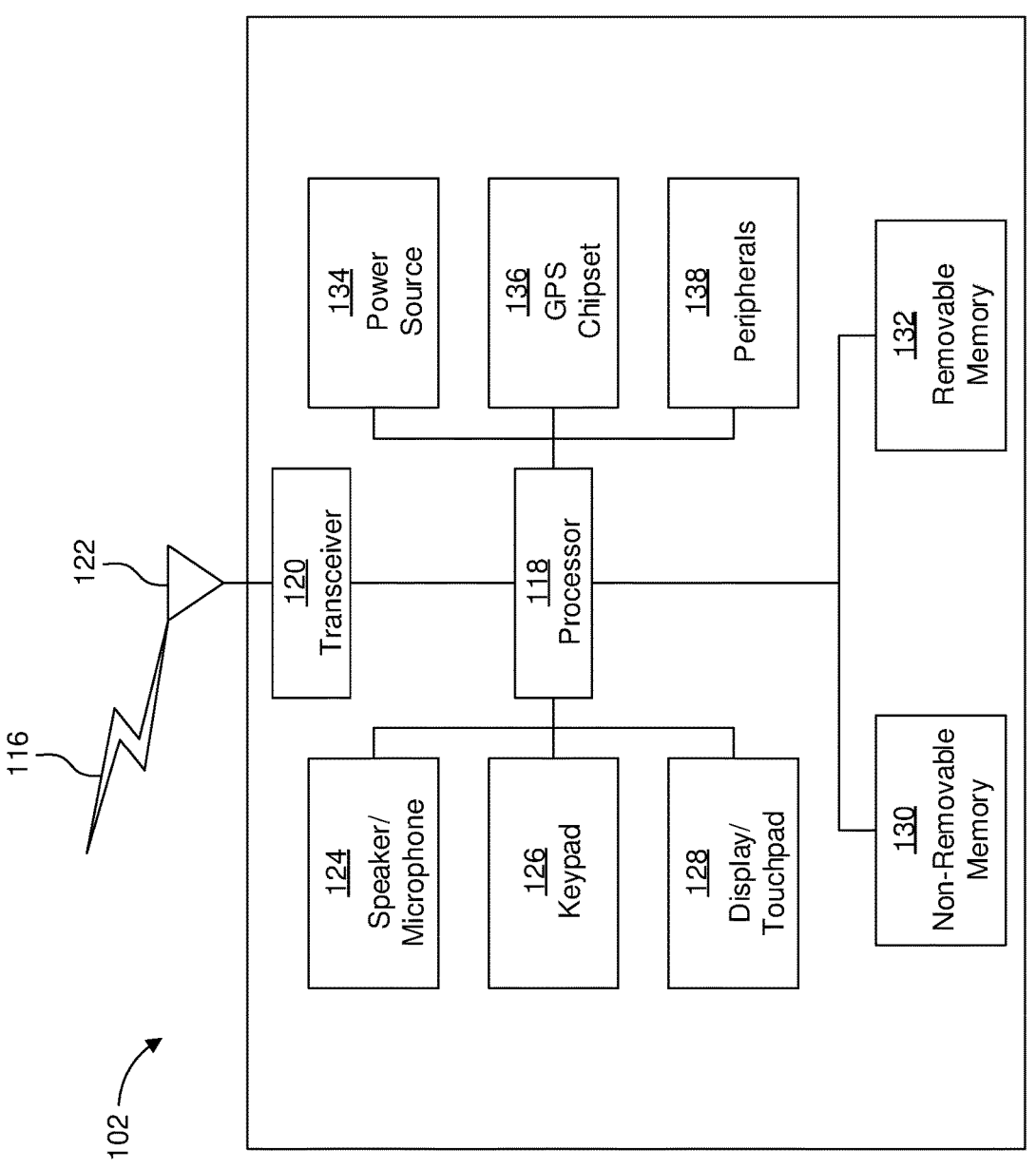
FIG. 1B is a system diagram illustrating an example wireless transmit/receive unit (WTRU) that may be used within the communications system illustrated in FIG. 1A according to an embodiment.
Figure 1C:
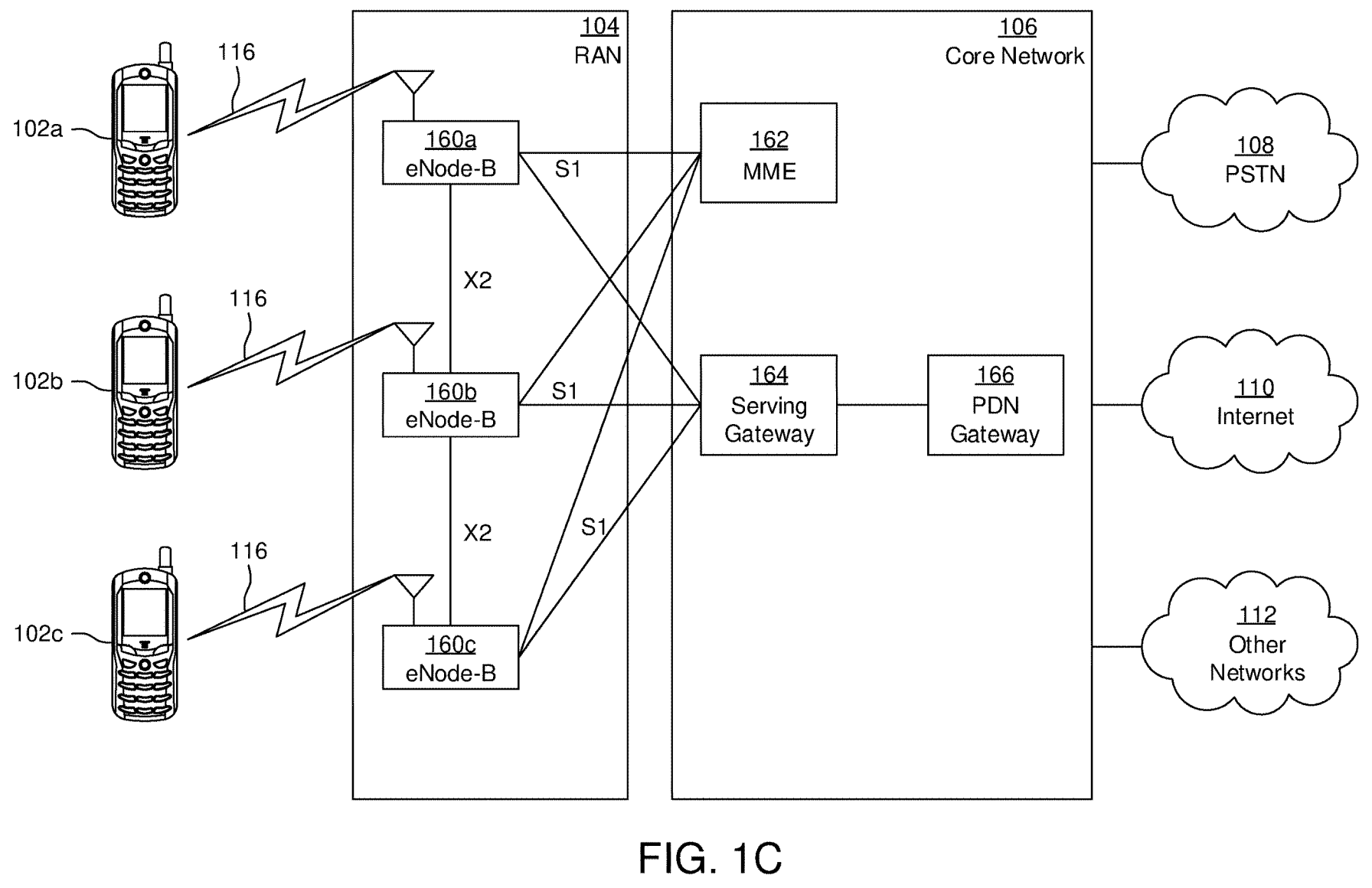

FIG. 1B is a system diagram illustrating an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and/or other peripherals 138, among others. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In yet another embodiment, the transmit/receive element 122 may be configured to transmit and/or receive both RF and light signals. It will be appreciated that the transmit/receive element 122 may be configured to transmit and/or receive any combination of wireless signals.

Although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as NR and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs and/or video), a universal serial bus (USB) port, a vibration device, a television transceiver, a hands free headset, a Bluetooth® module, a frequency modulated (FM) radio unit, a digital music player, a media player, a video game player module, an Internet browser, a Virtual Reality and/or Augmented Reality (VR/AR) device, an activity tracker, and the like. The peripherals 138 may include one or more sensors, the sensors may be one or more of a gyroscope, an accelerometer, a hall effect sensor, a magnetometer, an orientation sensor, a proximity sensor, a temperature sensor, a time sensor; a geolocation sensor; an altimeter, a light sensor, a touch sensor, a magnetometer, a barometer, a gesture sensor, a biometric sensor, and/or a humidity sensor.

The WTRU 102 may include a full duplex radio for which transmission and reception of some or all of the signals (e.g., associated with particular subframes for both the UL (e.g., for transmission) and downlink (e.g., for reception) may be concurrent and/or simultaneous. The full duplex radio may include an interference management unit 139 to reduce and or substantially eliminate self-interference via either hardware (e.g., a choke) or signal processing via a processor (e.g., a separate processor (not shown) or via processor 118). In an embodiment, the WTRU 102 may include a half-duplex radio for which transmission and reception of some or all of the signals (e.g., associated with particular subframes for either the UL (e.g., for transmission) or the downlink (e.g., for reception)).

FIG. 10 is a system diagram illustrating the RAN 104 and the CN 106 according to an embodiment. As noted above, the RAN 104 may employ an E-UTRA radio technology to communicate with the WTRUs 102a, 102b, 102c over the air interface 116. The RAN 104 may also be in communication with the CN 106.

The RAN 104 may include eNode-Bs 160a, 160b, 160c, though it will be appreciated that the RAN 104 may include any number of eNode-Bs while remaining consistent with an embodiment. The eNode-Bs 160a, 160b, 160c may each include one or more transceivers for communicating with the WTRUs 102a, 102b, 102c over the air interface 116. In one embodiment, the eNode-Bs 160a, 160b, 160c may implement MIMO technology. Thus, the eNode-B 160a, for example, may use multiple antennas to transmit wireless signals to, and/or receive wireless signals from, the WTRU 102a.

Each of the eNode-Bs 160a, 160b, 160c may be associated with a particular cell (not shown) and may be configured to handle radio resource management decisions, handover decisions, scheduling of users in the UL and/or DL, and the like. As shown in FIG. 10, the eNode-Bs 160a, 160b, 160c may communicate with one another over an X2 interface.

The CN 106 shown in FIG. 10 may include a mobility management entity (MME) 162, a serving gateway (SGW) 164, and a packet data network (PDN) gateway (or PGW) 166. While each of the foregoing elements is depicted as part of the CN 106, it will be appreciated that any of these elements may be owned and/or operated by an entity other than the CN operator.

The MME 162 may be connected to each of the eNode-Bs 160a, 160b, 160c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may provide a control plane function for switching between the RAN 104 and other RANs (not shown) that employ other radio technologies, such as GSM and/or WCDMA.

The SGW 164 may be connected to each of the eNode Bs 160a, 160b, 160c in the RAN 104 via the S1 interface. The SGW 164 may generally route and forward user data packets to/from the WTRUs 102a, 102b, 102c. The SGW 164 may perform other functions, such as anchoring user planes during inter-eNode B handovers, triggering paging when DL data is available for the WTRUs 102a, 102b, 102c, managing and storing contexts of the WTRUs 102a, 102b, 102c, and the like.

The SGW 164 may be connected to the PGW 166, which may provide the WTRUs 102a, 102b, 102c with access to packet-switched networks, such as the Internet 110, to facilitate communications between the WTRUs 102a, 102b, 102c and IP-enabled devices.

The CN 106 may facilitate communications with other networks. For example, the CN 106 may provide the WTRUs 102*a*, 102*b*, 102*c* with access to circuit-switched networks, such as the PSTN 108, to facilitate communications between the WTRUs 102*a*, 102*b*, 102*c* and traditional land-line communications devices. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102*a*, 102*b*, 102*c* with access to the other networks 112, which may include other wired and/or wireless networks that are owned and/or operated by other service providers.

Although the WTRU is described in FIGS. 1A-1D as a wireless terminal, it is contemplated that in certain representative embodiments that such a terminal may use (e.g., temporarily or permanently) wired communication interfaces with the communication network.

In representative embodiments, the other network 112 may be a WLAN.

A WLAN in Infrastructure Basic Service Set (BSS) mode may have an Access Point (AP) for the BSS and one or more stations (STAs) associated with the AP. The AP may have an access or an interface to a Distribution System (DS) or another type of wired/wireless network that carries traffic in to and/or out of the BSS. Traffic to STAs that originates from outside the BSS may arrive through the AP and may be delivered to the STAs. Traffic originating from STAs to destinations outside the BSS may be sent to the AP to be delivered to respective destinations. Traffic between STAs within the BSS may be sent through the AP, for example, where the source STA may send traffic to the AP and the AP may deliver the traffic to the destination STA. The traffic between STAs within a BSS may be considered and/or referred to as peer-to-peer traffic. The peer-to-peer traffic may be sent between (e.g., directly between) the source and destination STAs with a direct link setup (DLS). In certain representative embodiments, the DLS may use an 802.11e DLS or an 802.11z tunneled DLS (TDLS). A WLAN using an Independent BSS (IBSS) mode may not have an AP, and the STAs (e.g., all of the STAs) within or using the IBSS may communicate directly with each other. The IBSS mode of communication may sometimes be referred to herein as an "ad-hoc" mode of communication.

When using the 802.11ac infrastructure mode of operation or a similar mode of operations, the AP may transmit a beacon on a fixed channel, such as a primary channel. The primary channel may be a fixed width (e.g., 20 MHz wide bandwidth) or a dynamically set width via signaling. The primary channel may be the operating channel of the BSS and may be used by the STAs to establish a connection with the AP. In certain representative embodiments, Carrier Sense Multiple Access with Collision Avoidance (CSMA/CA) may be implemented, for example in in 802.11 systems. For CSMA/CA, the STAs (e.g., every STA), including the AP, may sense the primary channel. If the primary channel is sensed/detected and/or determined to be busy by a particular STA, the particular STA may back off. One STA (e.g., only one station) may transmit at any given time in a given BSS.

High Throughput (HT) STAs may use a 40 MHz wide channel for communication, for example, via a combination of the primary 20 MHz channel with an adjacent or nonadjacent 20 MHz channel to form a 40 MHz wide channel.

Very High Throughput (VHT) STAs may support 20 MHz, 40 MHz, 80 MHz, and/or 160 MHz wide channels. The 40 MHz, and/or 80 MHz, channels may be formed by combining contiguous 20 MHz channels. A 160 MHz channel may be formed by combining 8 contiguous 20 MHz channels, or by combining two non-contiguous 80 MHz channels, which may be referred to as an 80+80 configuration. For the 80+80 configuration, the data, after channel encoding, may be passed through a segment parser that may divide the data into two streams. Inverse Fast Fourier Transform (IFFT) processing and time domain processing may be done on each stream separately. The streams may be mapped on to the two 80 MHz channels, and the data may be transmitted by a transmitting STA. At the receiver of the receiving STA, the above described operation for the 80+80 configuration may be reversed, and the combined data may be sent to the Medium Access Control (MAC).

Sub 1 GHz modes of operation are supported by 802.11af and 802.11ah. The channel operating bandwidths, and carriers, are reduced in 802.11af and 802.11ah relative to those used in 802.11n, and 802.11ac. 802.11af supports 5 MHz, 10 MHz and 20 MHz bandwidths in the TV White Space (TVWS) spectrum, and 802.11ah supports 1 MHz, 2 MHz, 4 MHz, 8 MHz, and 16 MHz bandwidths using non-TVWS spectrum. According to a representative embodiment, 802.11ah may support Meter Type Control/Machine-Type Communications, such as MTC devices in a macro coverage area. MTC devices may have certain capabilities, for example, limited capabilities including support for (e.g., only support for) certain and/or limited bandwidths. The MTC devices may include a battery with a battery life above a threshold (e.g., to maintain a very long battery life).

WLAN systems, which may support multiple channels, and channel bandwidths, such as 802.11n, 802.11ac, 802.11af, and 802.11ah, include a channel which may be designated as the primary channel. The primary channel may have a bandwidth equal to the largest common operating bandwidth supported by all STAs in the BSS. The bandwidth of the primary channel may be set and/or limited by a STA, from among all STAs in operating in a BSS, which supports the smallest bandwidth operating mode. In the example of 802.11ah, the primary channel may be 1 MHz wide for STAs (e.g., MTC type devices) that support (e.g., only support) a 1 MHz mode, even if the AP, and other STAs in the BSS support 2 MHz, 4 MHz, 8 MHz, 16 MHz, and/or other channel bandwidth operating modes. Carrier sensing and/or Network Allocation Vector (NAV) settings may depend on the status of the primary channel. If the primary channel is busy, for example, due to a STA (which supports only a 1 MHz operating mode), transmitting to the AP, the entire available frequency bands may be considered busy even though a majority of the frequency bands remains idle and may be available.

In the United States, the available frequency bands, which may be used by 802.11ah, are from 902 MHz to 928 MHz. In Korea, the available frequency bands are from 917.5 MHz to 923.5 MHz. In Japan, the available frequency bands are from 916.5 MHz to 927.5 MHz. The total bandwidth available for 802.11ah is 6 MHz to 26 MHz depending on the country code.

Figure 1D:
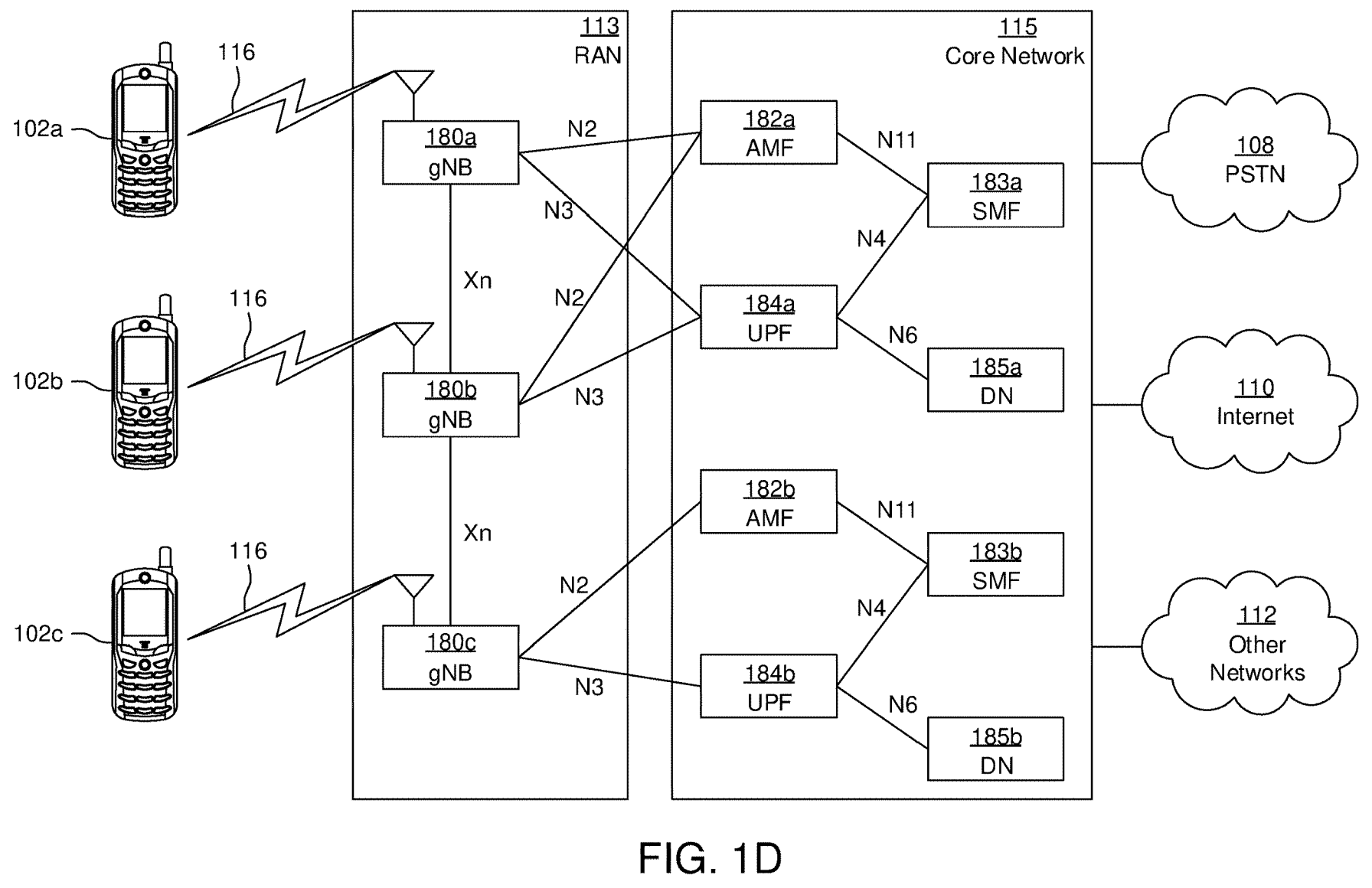

FIG. 1D is a system diagram illustrating the RAN 113 and the CN 115 according to an embodiment. As noted above, the RAN 113 may employ an NR radio technology to communicate with the WTRUs 102*a*, 102*b*, 102*c* over the air interface 116. The RAN 113 may also be in communication with the CN 115.

The RAN 113 may include gNBs 180*a*, 180*b*, 180*c*, though it will be appreciated that the RAN 113 may include any number of gNBs while remaining consistent with an embodiment. The gNBs 180*a*, 180*b*, 180*c* may each include one or more transceivers for communicating with the WTRUs 102*a*, 102*b*, 102*c* over the air interface 116. In one embodiment, the gNBs 180*a*, 180*b*, 180*c* may implement MIMO technology. For example, gNBs 180a, 180b may utilize beamforming to transmit signals to and/or receive signals from the WTRUs 102a, 102b, 102c. Thus, the gNB 180a, for example, may use multiple antennas to transmit wireless signals to, and/or receive wireless signals from, the WTRU 102a. In an embodiment, the gNBs 180a, 180b, 180c may implement carrier aggregation technology. For example, the gNB 180a may transmit multiple component carriers to the WTRU 102a (not shown). A subset of these component carriers may be on unlicensed spectrum while the remaining component carriers may be on licensed spectrum. In an embodiment, the gNBs 180a, 180b, 180c may implement Coordinated Multi-Point (COMP) technology. For example, WTRU 102a may receive coordinated transmissions from gNB 180a and gNB 180b (and/or gNB 180c).

The WTRUs 102a, 102b, 102c may communicate with gNBs 180a, 180b, 180c using transmissions associated with a scalable numerology. For example, the OFDM symbol spacing and/or OFDM subcarrier spacing may vary for different transmissions, different cells, and/or different portions of the wireless transmission spectrum. The WTRUs 102a, 102b, 102c may communicate with gNBs 180a, 180b, 180c using subframe or transmission time intervals (TTIs) of various or scalable lengths (e.g., containing varying number of OFDM symbols and/or lasting varying lengths of absolute time).

The gNBs 180a, 180b, 180c may be configured to communicate with the WTRUs 102a, 102b, 102c in a standalone configuration and/or a non-standalone configuration. In the standalone configuration, WTRUs 102a, 102b, 102c may communicate with gNBs 180a, 180b, 180c without also accessing other RANs (e.g., such as eNode-Bs 160a, 160b, 160c). In the standalone configuration, WTRUs 102a, 102b, 102c may utilize one or more of gNBs 180a, 180b, 180c as a mobility anchor point. In the standalone configuration, WTRUs 102a, 102b, 102c may communicate with gNBs 180a, 180b, 180c using signals in an unlicensed band. In a non-standalone configuration WTRUs 102a, 102b, 102c may communicate with/connect to gNBs 180a, 180b, 180c while also communicating with/connecting to another RAN such as eNode-Bs 160a, 160b, 160c. For example, WTRUs 102a, 102b, 102c may implement DC principles to communicate with one or more gNBs 180a, 180b, 180c and one or more eNode-Bs 160a, 160b, 160c substantially simultaneously. In the non-standalone configuration, eNode-Bs 160a, 160b, 160c may serve as a mobility anchor for WTRUs 102a, 102b, 102c and gNBs 180a, 180b, 180c may provide additional coverage and/or throughput for servicing WTRUs 102a, 102b, 102c.

Each of the gNBs 180a, 180b, 180c may be associated with a particular cell (not shown) and may be configured to handle radio resource management decisions, handover decisions, scheduling of users in the UL and/or DL, support of network slicing, dual connectivity, interworking between NR and E-UTRA, routing of user plane data towards User Plane Function (UPF) 184a, 184b, routing of control plane information towards Access and Mobility Management Function (AMF) 182a, 182b and the like. As shown in FIG. 1D, the gNBs 180a, 180b, 180c may communicate with one another over an Xn interface.

The CN 115 shown in FIG. 1D may include at least one AMF 182a, 182b, at least one UPF 184a, 184b, at least one Session Management Function (SMF) 183a, 183b, and possibly a Data Network (DN) 185a, 185b. While each of the foregoing elements is depicted as part of the CN 115, it will be appreciated that any of these elements may be owned and/or operated by an entity other than the CN operator.

The AMF 182a, 182b may be connected to one or more of the gNBs 180a, 180b, 180c in the RAN 113 via an N2 interface and may serve as a control node. For example, the AMF 182a, 182b may be responsible for authenticating users of the WTRUs 102a, 102b, 102c, support for network slicing (e.g., handling of different PDU sessions with different requirements), selecting a particular SMF 183a, 183b, management of the registration area, termination of NAS signaling, mobility management, and the like. Network slicing may be used by the AMF 182a, 182b in order to customize CN support for WTRUs 102a, 102b, 102c based on the types of services being utilized by WTRUs 102a, 102b, 102c. For example, different network slices may be established for different use cases such as services relying on ultra-reliable low latency (URLLC) access, services relying on enhanced massive mobile broadband (eMBB) access, services for machine type communication (MTC) access, and/or the like. The AMF 182a, 182b may provide a control plane function for switching between the RAN 113 and other RANs (not shown) that employ other radio technologies, such as LTE, LTE-A, LTE-A Pro, and/or non-3GPP access technologies such as WiFi.

The SMF 183a, 183b may be connected to an AMF 182a, 182b in the CN 115 via an N11 interface. The SMF 183a, 183b may also be connected to a UPF 184a, 184b in the CN 115 via an N4 interface. The SMF 183a, 183b may select and control the UPF 184a, 184b and configure the routing of traffic through the UPF 184a, 184b. The SMF 183a, 183b may perform other functions, such as managing and allocating UE IP address, managing PDU sessions, controlling policy enforcement and QoS, providing downlink data notifications, and the like. A PDU session type may be IP-based, non-IP based, Ethernet-based, and the like.

The UPF 184a, 184b may be connected to one or more of the gNBs 180a, 180b, 180c in the RAN 113 via an N3 interface, which may provide the WTRUs 102a, 102b, 102c with access to packet-switched networks, such as the Internet 110, to facilitate communications between the WTRUs 102a, 102b, 102c and IP-enabled devices. The UPF 184a, 184b may perform other functions, such as routing and forwarding packets, enforcing user plane policies, supporting multi-homed PDU sessions, handling user plane QoS, buffering downlink packets, providing mobility anchoring, and the like.

The CN 115 may facilitate communications with other networks. For example, the CN 115 may include, or may communicate with, an IP gateway (e.g., an IP multimedia subsystem (IMS) server) that serves as an interface between the CN 115 and the PSTN 108. In addition, the CN 115 may provide the WTRUs 102a, 102b, 102c with access to the other networks 112, which may include other wired and/or wireless networks that are owned and/or operated by other service providers. In one embodiment, the WTRUs 102a, 102b, 102c may be connected to a local Data Network (DN) 185a, 185b through the UPF 184a, 184b via the N3 interface to the UPF 184a, 184b and an N6 interface between the UPF 184a, 184b and the DN 185a, 185b.

In view of FIGS. 1A-1D, and the corresponding description of FIGS. 1A-1D, one or more, or all, of the functions described herein with regard to one or more of: WTRU 102a-d, Base Station 114a-b, eNode-B 160a-c, MME 162, SGW 164, PGW 166, gNB 180a-c, AMF 182a-ab, UPF 184a-b, SMF 183a-b, DN 185a-b, and/or any other device(s) described herein, may be performed by one or more emulation devices (not shown). The emulation devices may be one or more devices configured to emulate one or more, or all, of the functions described herein. For example, the emulation devices may be used to test other devices and/or to simulate network and/or WTRU functions.

The emulation devices may be designed to implement one or more tests of other devices in a lab environment and/or in an operator network environment. For example, the one or more emulation devices may perform the one or more, or all, functions while being fully or partially implemented and/or deployed as part of a wired and/or wireless communication network in order to test other devices within the communication network. The one or more emulation devices may perform the one or more, or all, functions while being temporarily implemented or deployed as part of a wired and/or wireless communication network. The emulation device may be directly coupled to another device for purposes of testing and/or may performing testing using over-the-air wireless communications.

The one or more emulation devices may perform the one or more, including all, functions while not being implemented or deployed as part of a wired and/or wireless communication network. For example, the emulation devices may be utilized in a testing scenario in a testing laboratory and/or a non-deployed (e.g., testing) wired and/or wireless communication network in order to implement testing of one or more components. The one or more emulation devices may be test equipment. Direct RF coupling and/or wireless communications via RF circuitry (e.g., which may include one or more antennas) may be used by the emulation devices to transmit and/or receive data.

Example of Application Functions

A (e.g., home, WLAN, LAN) network may comprise multiple devices (e.g., with different capabilities), for example, connected wirelessly via different access technologies, cooperating with each other to provide applications and services to users and/or devices in the (e.g., home, WLAN, LAN) network. The (e.g., home, WLAN, LAN) network may comprise any number of gateway devices providing a multi Radio Access Technology (RAT) convergence point, enabling any of in-home local networking, in-home edge computing. The multi-RAT gateway device may enable the integration of the (e.g., home) network to external networks, applications, and services. The (e.g., home) network may be part of a Third Generation Partnership Project (3GPP) private virtual networks (e.g., per application vertical) for residential setting and may be controlled by a 3GPP core network. In that context, some network functions (NF) of the 3GPP core network (such as the NWDAF) may be located on the (e.g., home) gateway devices.

Application functions (AF), for example, running on (e.g., home) devices may involve multiple WTRUs. For example, a Virtual Reality (VR) game device may interact with multiple cameras (e.g., for localization of users), one VR equipment per user, a device with (e.g., sufficient) processing power. In another example, an interactive teleconference system may involve interaction between a display equipment, any number of localization cameras . . . . In these examples, (e.g., each of) these individual WTRUs may contribute to the global Quality of Experience (QoE) of the application.

Embodiments described herein may allow any of a (e.g., home) gateway device, and a set of Points of Access (PoAs) to determine which resources to allocate to which WTRUs for improving the overall (e.g., network, application) performance.

According to embodiments, a Network Data Analytics Function (NWDAF) may be based on data provided, for example, by any of an Access and Mobility Function (AMF), a Session Management Function (SMF), a Policy Control Function (PCF), a Unified Data Management (UDM), an Application Function (AF) (e.g., directly or via a Network Exposure Function (NEF)), and Operation and Maintenance (OAM). NWDAF may provide access to analytics services, that may be any of statistical information in the past, and predictive information in the future. These analytics services may be used by any of 5G System Network Functions and OAM to improve the network performance.

According to embodiments, a WTRU, (e.g., any of a gaming console, a tablet, a PC and a smart phone) may run (e.g., execute) an application such as, for example any of an immersive game, a teleconference application and a surveillance system. This application may be referred to herein as an Application Function (AF). While executing the application, the WTRU may receive and process data from other (e.g., user) devices such as any of WTRUs, sensors, cameras. For example, the output of the processing on e.g. a game console may generate data, such as, for example, a rendered video stream that may be sent (e.g., transmitted) to another device such as any of a WTRU, a VR headset, a smart phone.

According to embodiments, a WTRU, such as for example a (e.g., home) gateway or any other device configured to manage the (e.g., home) network infrastructure, may receive messages, from another WTRU (e.g. running an application as described above) containing metrics and measurements related to the QoE of the application. These metrics may include, for example, any of a resolution of a rendered video stream, a precision (e.g., and confidence) of a user localization (e.g., within the home), a (e.g., latency) time for sending video portions to other WTRUs. According to embodiments, the (e.g., home) gateway may host (e.g., run, execute) a NWDAF, for example, configured to collect metrics and to obtain (e.g., determine, calculate, compute) predictions on these metrics. Examples of metrics obtained by the NWDAF may include an estimated service experience/QoE which may be e.g., any of a Mean Opinion Score (MOS), an average resolution, an average latency etc.

A Mean Opinion Score (MOS) may be seen as a measure of a QoE representing an overall quality of a service or a system as experienced by an end-user. A MOS may be used to measure a quality of (e.g., a large range of) services including any of video, audio, audiovisual, web page browsing and games. A MOS may be based, for example, on end-user panels, subjectively rating the quality of their experience for a service or a system. A MOS may be represented by a single rational number, for example, in the range 1-5, where 1 is lowest perceived quality, and 5 is the highest perceived quality. A MOS may be represented by any other numeric value, such as, for example, between 1-100. Based on subjective ratings (e.g., obtained from end-user panels), a set of low-level metrics (such as any of latency, jitter, CPU load, page load time, network throughput, video resolution, video coding rate, number of resolution changes, audio coding rate, game lag etc.) may be mapped to a mean opinion score according to a model. A MOS may be (e.g., automatically) estimated according to the model based on low level metrics that may have been collected (e.g., measured).

According to embodiments, a (e.g., home) gateway may receive messages (e.g., data, packets) from network apparatuses (such as e.g., routers, extenders) that may be connected to the local (e.g., home) network. These messages may include (e.g., network) metrics such as e.g., any of a wireless signal strength, a latency and a throughput. The network apparatuses (such as e.g., routers, extenders) may run (e.g., execute) a function that may be referred to herein as a Network Function (NF).

According to embodiments, the network apparatuses (such as e.g., routers, extenders) may run NFs configured to transmit to the (e.g., home) gateway, messages (e.g., data, packets) including a subscription request for an (e.g., estimated) QoE/service experience for a (e.g., given) application. These NFs (e.g., configured to request subscription to QoE metrics) may be referred to herein as "consumer NFs". According to embodiments, the (e.g., home) gateway may transmit messages containing the (e.g., estimated) service experience to the subscribed network apparatuses (e.g., having subscribed to the metrics). The network apparatuses may (e.g., decide to) change their behavior based on the metrics/estimated service experience received from the (e.g., home) gateway. For example, a router may prioritize (increase a priority of) or deprioritize (e.g., decrease a priority of) a traffic flow based on the received (e.g., QoE) metrics. In another example, a router may route a traffic through a specific interface or radio access technology based on the received (e.g., QoE) metrics. In yet another example, a game console may send a message to the (e.g., home) gateway indicating, for example, a poor QoE (e.g. bad user localization). The (e.g., home) gateway may transmit a message containing the QoE metric (or any derived metric such as any of a mean and a median) to the subscribed network apparatuses, which may decide to change the priority of the traffic of the game console. The resulting QoE may, however, not be improved despite the change of the priority of the traffic, for example, because the root cause of the QoE degradation may be a poor (e.g., bad, degraded) connection of one of the sensors or the video cameras.

According to embodiments, a NWDAF may provide analytics about the (e.g., observed, measured, monitored) service experience of an application (e.g., a VR game, a teleconference application). The NWDAF may collect service data (e.g., QoE) from the AF and network data (e.g., QoS) from NFs. Service data, that may be collected from (e.g., transmitted by) an AF are depicted in Table 1.

TABLE 1

Service data related to (e.g., observed) service experience.

| Information | Source | Description |
|---|---|---|
| Locations of Application | AF/ NEF | Locations of application represented by a list of Data Network Access Identifier(s) (DNAI(s)). The NEF may map the AF-Service-Identifier information to a list of DNAI(s) when the DNAI(s) being used by the application are statically defined. |
| Application ID | AF | To identify the service and support analytics per type of service (the desired level of service) |
| Service Experience | AF | Refers to the QoE as established in the Service Level Agreement (SLA) and during on boarding. It may be any kind of MOS |
| Timestamp | AF | A time stamp associated with the observed level of Service Experience provided by the AF. |

According to embodiments, network data, such as for example QoS flow level network data may be collected from (e.g., transmitted by) a NF. The network data may be related to a QoS profile associated with a (e.g., particular) service identified, for example, by an application identifier or an IP filter information. A QoS profile, may be, for example, a QoS class identifier (QCI) that may represent QoS categories. A QoS category may have any of a priority, a packet delay budget, and a packet loss rate. A QoS profile may also relate to QoS classes assigning a priority to traffic. An IP filter may be, for example, a set of IP addresses or IP address ranges identifying traffics flows (e.g. Protocol Data Unit (PDU) sessions) used by a service. The network data are depicted in Table 2.

TABLE 2

(e.g., QoS flow level) network data related to a QoS profile assigned to a service.

| Information | Source | Description |
|---|---|---|
| Timestamp | 5GC NF | A time stamp associated with the collected information. |
| Location Info | AMF | The WTRU location information when the service is delivered. |
| DNN | SMF | To identify the DNN for the PDU Session which contains the QoS flow |
| S-NSSAI | SMF | To identify the S-NSSAI for the PDU Session which contains the QoS flow |
| Application ID | PCF/SMF | Provided by the AF, which is used by NWDAF to identify the application service provider and application for the QoS flow |
| IP filter information | | Provided by the AF, which is used by NWDAF to identify the service data flow for policy control and/or differentiated charging for the QoS flow |
| QFI | AMF/PCF/SMF | QoS Flow Identifier |
| QoS flow Bit Rate | UPF | The observed bit rate for UL direction; and The observed bit rate for DL direction |
| QoS flow Packet Delay | UPF | The observed Packet delay for UL direction; and The observed Packet delay for the DL direction |
| Packet transmission | UPF | The observed number of packet transmission |
| Packet retransmission | UPF | The observed number of packet retransmission |

According to embodiments, network data related to a WTRU may be collected via OAM protocols. The network data related to the QoS profile are depicted in Table 3.

TABLE 3

WTRU level OAM network data related to the QoS profile.

| Information | Source | Description |
|---|---|---|
| Reference Signal Received Power | OAM | Per WTRU measurement of the received power level in a network cell, including a Synchronization Signal (SS) Reference Signal Received Power (SS- RSRP), a Channel State Information (CSI) Reference Signal Received Power (CSI-RSRP). |
| Reference Signal Received Quality | OAM | Per WTRU measurement of the received quality in a network cell, including a SS Reference Signal Received Quality (SS-RSRQ), a CSI Reference Signal Received Quality (CSI-RSRQ). |
| Signal-to-noise and interference ratio | OAM | Per WTRU measurement of the received signal to noise and interference ratio in a network cell, including a SS Signal to Interference and to Noise Ratio (SS-SINR), a CSI Signal to Interference and to Noise Ratio CSI-SINR, an E-UTRA RS-SINR |

Figure 2:
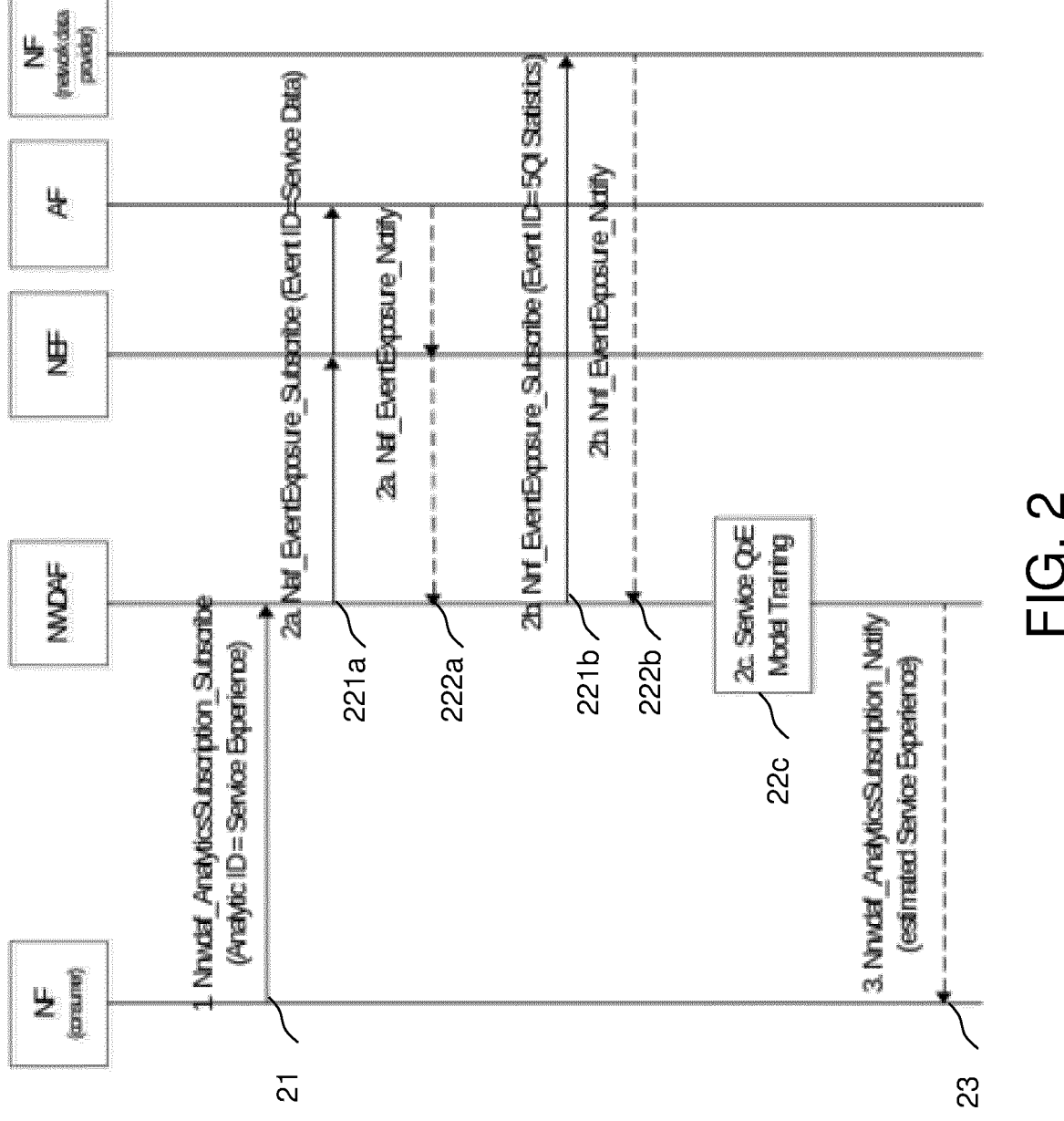
FIG. 2 is a diagram illustrating an example of a message exchange for analytics subscription and data collection.

FIG. 2 is a diagram illustrating an example of a message exchange for analytics subscription and data collection. According to embodiments, a NF may subscribe to a NWDAF by sending to the NWDAF an Analytics request/subscribe message 21, for example by invoking an (Analytics ID Service=Service Experience, Analytic Filter information=(Application ID, time window, Single Network Slice Selection Assistance Information (S-NSSAI), Data Network Name (DNN), Area of Interest)) service. For example, the NF may transmit a message 21 (e.g., a packet) containing a request for analytics. The request for analytics may be referred to herein as a subscription for analytics. The request for analytics may include a first information indicating the type of analytics requested (e.g., Analytics ID) that may be set to "Service Experience". The request for analytics may include a second information allowing to filter/select metrics. The second information may contain any of an application identifier, a time window, session and network identifiers, such as any of a Single Network Slice Selection Assistance Information (S-NSSAI), a Data Network Name (DNN) and an area of interest. An area of interest may be, for example, a list of any of wireless cells, access points, and points of access. A subscribed NF (e.g., a NF having subscribed to analytics) may be referred to herein as a NF consumer.

According to embodiments, a NWDAF may collect data (e.g., on which analytics have been requested), by, for example, transmitting a subscription message 221a to the AF for collecting service data, and by transmitting a further subscription message 221b to any number of NFs for collecting network data. According to embodiments, service data may be collected by receiving a notification message 222a from the AF and network data may be collected by receiving notification message(s) 222b from any number of NFs. The NWDAF may train 22c a QoE model based on collected network and service data. The NWDAF may provide the (e.g., consumer) NF with any of an observed Service Experience (e.g. average MOS), a spatial validity condition, (e.g., indicating where the estimated Service Experience may apply), and a time validity condition (e.g., indicating when the estimated Service Experience may apply). For example, the NWDAF may transmit messages 23 (e.g., packets) to subscribed NFs (NF consumer) including metrics received from any of the AF and other NFs. The message 23 transmitted by the NWDAF may include, for example, any of an average MOS, an average resolution, an average latency etc. The message 23 may include indications of which area (e.g. list of cells or point of access) the sent metrics may apply. The message may include indications of which time interval (e.g. t0 to t1) the sent metrics may apply.

According to embodiments, "requesting, transmitting a message/packet requesting" may correspond to any of a request for a single response and a request (e.g., subscription) for a set of (e.g., successive) updates. For example, (e.g., response, notification) messages may be sent in case updated metrics or prediction may become available.

Mechanisms for collecting QoE of an AF and network metrics may be designed for an AF related to a single WTRU and may be adapted to an AF related to multiple (e.g., any number of) WTRUs. For example, a Virtual Reality (VR) gaming AF may interact with multiple WTRUs (e.g., cameras) for localization, one VR equipment per user, processing power for rendering. In another example an interactive teleconference AF may interact with a display apparatus, any number of localization cameras . . . ). In yet another example, a vehicle to vehicle communication AF may interact with any number of sensors in a car, relay on the road, communication to nearby cars . . . .

Embodiments described herein may allow a NWDAF, having sent a query to an AF for data analytics, to identify WTRUs that the AF and devices targeted in the query may rely on (e.g., may interact with, may exchange data with). While a consumer NF may query for (e.g., send requests, analytics subscription requests to) specific devices or area, the AF running in these devices may depend on contributions from (e.g., services, applications running on) WTRUs not indicated in the consumer NF query (such as, for example, sensors collecting information about a player's actions in another house, or a WTRU connected to an AP not part of the request such as a 3G/4G/5G base station). A query targeting a specific area (such as a particular house), may include other WTRUs (e.g., irrelevant to the AF) such as a 5G-enabled microwave, or an unused VR headset or sensor). Embodiments described herein may allow a NWDAF to identify the WTRUs involved in the service provided by the AF and to ignore other WTRUs not involved in that service.

Several WTRUs in a same location may run a same type of AF (e.g., a VR gaming) but contribute to the QoE of two independent services. For example, two children may play a VR game independently of each other in a same (e.g., home) network. Embodiments described herein may allow to manage the analytics for the two services independently of each other.

Embodiments described herein may be used, for example, in online VR gaming. The VR game may be rendered on a game console that may obtain data from other players from the cloud. The game console may render and stream the game to a player VR headset. The QoS of both the game console and VR headset devices may impact the QoE. For example, latency which is known to impact gaming QoE may be impacted by the QoS of any of the link between the console and the cloud and the link between the console and the headset. Embodiments described herein may allow the NWDAF to determine which of the two links may be a cause of a QoE degradation.

Embodiments described herein may allow to dynamically update the list of WTRUs associated with an AF.

Embodiments described herein may allow to associate (e.g., correlate) a QoS improvement of a specific WTRU with a QoE improvement.

Embodiments described herein may allow to improve the QoE of an AF involving multiple WTRUs by allowing to quantify individual contributions of (e.g., each of) the WTRUs to the QoE.

Embodiments described herein may allow for a (e.g., home) network (e.g. a gateway, or a set of PoAs in the home) to identify WTRUs to which resources should be allocated in order to reach a targeted QoE for an AF.

Embodiments described herein may allow to identify the WTRUs that may support (e.g., contribute resources to) an application, without running (executing) the application. Examples of such WTRUs may include sensors, cameras, . . . .

Embodiments described herein may allow to query the NWDAF to estimate the impact on the QoE of a change in network parameters.

According to embodiments, actionable QoE information may be exchanged with an AF involving any number of WTRUs. By actionable, it is meant here that exchanging QoE information between different entities (NEF, NWDAF, AF, NF) may produce actions in the network, (e.g., QoS policy changes). A set (e.g., group, list) of WTRUs (e.g., identifiers) may be associated with an AF. The set of WTRUs (e.g., identifiers) may be transmitted by the AF to the NWDAF. The AF may, for example, transmit an information to the NWDAF indicating which WTRUs may take part (e.g., contribute to) the application. The AF may transmit identifiers of those WTRUs. The NWDAF may collect QoS data related to these WTRUs (in association with the AF). The AF may transmit an information to the NWDAF indicating (e.g., individual) contributions (e.g., such as any of scores, weights) of WTRUs to the QoE. The contribution (e.g., any of scores, weights) may be obtained (determined, computed) by the AF and transmitted by the AF to the NWDAF.

According to embodiments, a NWDAF may be queried about (e.g., receive a packet requesting) information indicating how QoS parameters may be updated for WTRUs. For example, the NWDAF may be capable of providing (e.g., transmitting) a QoS modification for a WTRU for achieving a (e.g., target) QoE for the AF. A NF may, for example, provide (e.g., transmit to) the NWDAF with a (e.g., target) QoE for the application, and the NWDAF may respond (e.g., transmit back) to the NF a configuration for the WTRU. The configuration of the WTRU may be, for example, a set of pairs of (WTRU ID, QoS parameter), wherein a pair includes a WTRU identifier and a QoS parameter suggested (e.g., determined) by the NWDAF for that WTRU. For example, the NWDAF may be capable of providing an estimation of the QoE of an AF that would result from a suggested QoS modification. The NF may, for example, provide (transmit to) the NWDAF with a QoS configuration for any of a WTRU and a set of WTRUs (e.g., a set of pairs (WTRU ID, QoS parameter) and the NWDAF may respond to the NF with a QoE (e.g., estimated) for the application based on the QoS configuration.

Figure 3:
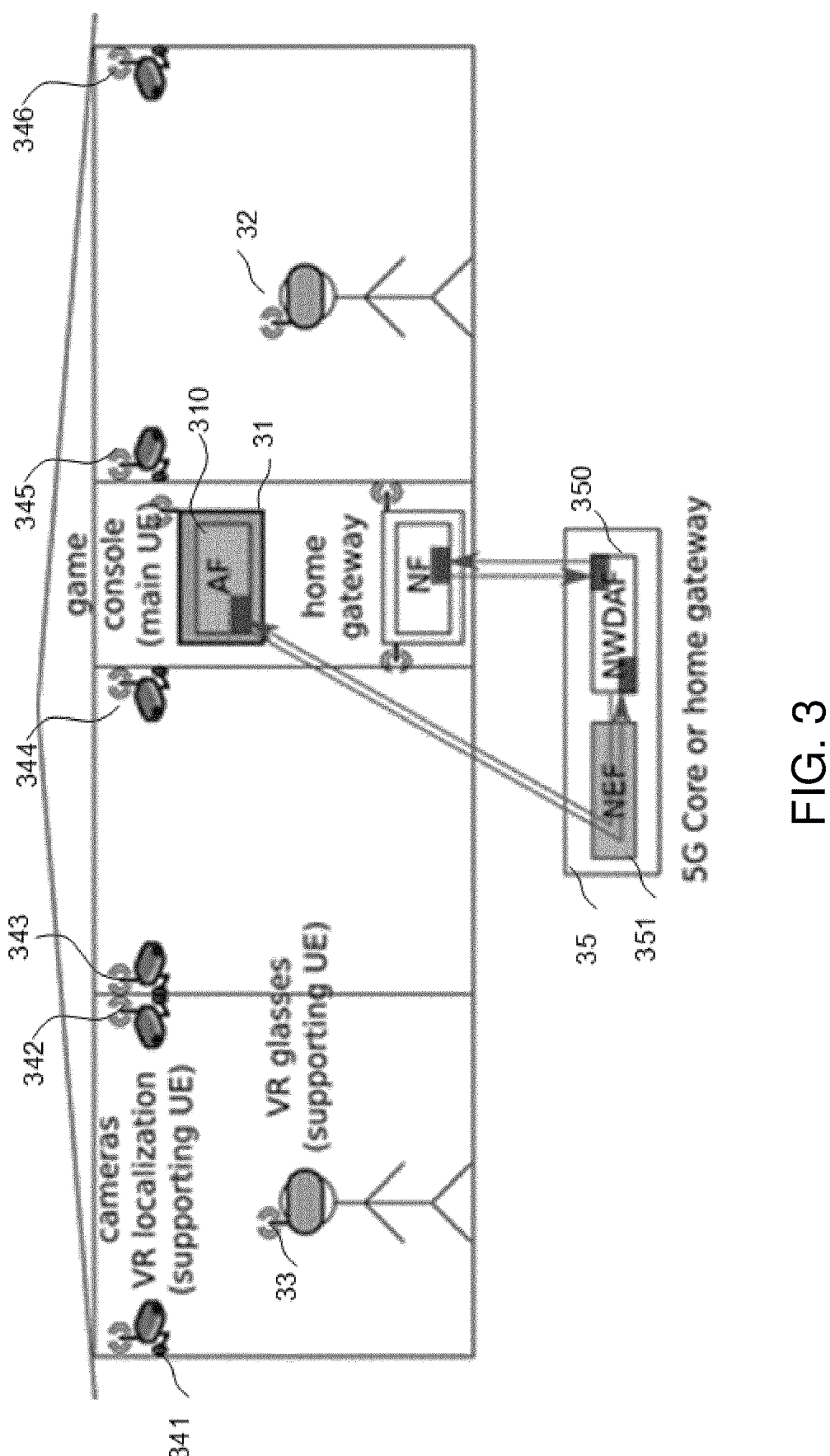
FIG. 3 is a system diagram illustrating an example of an application function running on a device.

FIG. 3 is a system diagram illustrating an example of a VR gaming application function 310 running on a game console device 31. The VR gaming AF 310 may be a multi-player VR game involving two VR headsets 32, 33 carried by two different users located in two different rooms. The VR gaming may involve a set of cameras 341, 342, 343, 344, 345, 346 located in the different rooms and configured to locate the users (e.g., headsets) in the different rooms. The AF function 310 may be running (e.g., executing) in the game console device 31. The NWDAF function 350 may be running (e.g., executing) in any of the (e.g., home) gateway 35 and a (e.g., 5G core) network gateway. The NF function 351 may be running (e.g., executing) in the (e.g., home) gateway 35, and may be configurable to allocate resources (e.g. more bandwidth, higher QoS/priority) to the WTRUs that may negatively impact the QoE of the VR gaming application. The NF 351 may also be configurable to free resources used by WTRUs that may (e.g., currently) not impact the QoE of any application. In other (not illustrated) examples, the AF may be running (e.g., executing) on any of a camera, a VR headset, a Set-top-box. For example, the AF may be running (e.g., executing) on each WTRU (e.g., camera, a VR headset, a Set-top-box, . . . ) involved in the multi WTRU Application. The arrows illustrate the message exchanges flowing respectively between the NF and the NWDAF, the NWDAF and the AF via the NEF, and which are described herein in FIG. 4 to FIG. 7. According to embodiments the multi WTRU AF illustrated in FIG. 4 to FIG. 7 may run on a (e.g., single WTRU) or on any (e.g., each) WTRU. For example, the NWDAF may receive service data related to different WTRUs from the different WTRUs, where e.g., each WTRU running an AF may send service data related to that WTRU. In another example, the NWDAF may receive service data related to different WTRUs from a single network element (e.g., a WTRU), that may retrieve the service data related to the different WTRUs from the different WTRUs, for example, at the application level.

Embodiments are described herein according to four categories of features: (1) monitoring information from a set of WTRU(s) involved in an AF, (2) collecting information on individual contributions of WTRUs to a QoE, (3) estimating a QoE based on a QoS configuration, and (4) obtaining a QoS configuration for a target QoE.

Monitoring Information from a Set of WTRU(s)

According to embodiments, a NWDAF may acquire a set of identifiers of WTRUs involved in an AF. For example, the NWDAF may transmit a request to an AF for subscribing to analytics of the AF. The AF may transmit a response to the NWDAF including a set of identifiers of WTRUs involved in (e.g., impacting the QoE of) the AF. In a variant, the set of WTRUs involved in the AF may vary and the AF may transmit updates of the set of identifiers of involved WTRUs. According to embodiments, the NWDAF may transmit requests targeting the involved WTRUs in the AF for network information.

Figure 4:
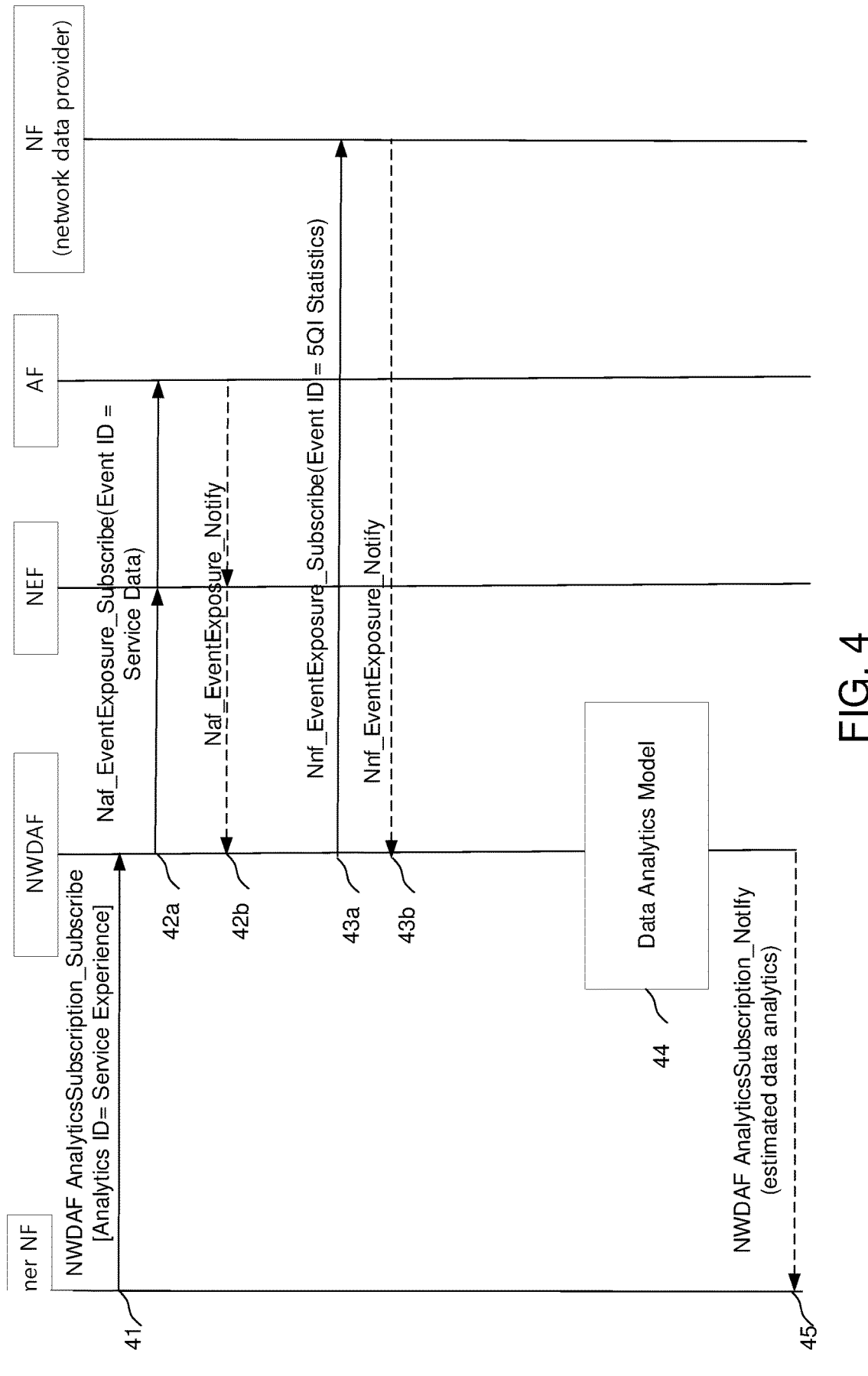
FIG. 4 is a diagram illustrating an example of a message exchange for monitoring information of a set of WTRUs.

FIG. 4 is a diagram illustrating an example of a message exchange for monitoring information of a set of WTRUs involved in an AF. A set of WTRUs involved in an AF may include any of cameras for localizing players in a VR/AR game, VR headsets, . . . .

According to embodiments, a (e.g., device running a) consumer NF may send (e.g., transmit) a first request message 41 to (e.g., a device running) the NWDAF for subscribing to analytics by, for example, invoking any of a Nwdaf_AnalyticsSubscription_Subscribe and a Nwdaf_AnalyticsInfo_Request service. The first request message 41 may include a first information indicating the type of analytics requested (e.g., Analytics ID) that may be set to "Service Experience". The request for analytics may include a second information allowing to filter/select the metrics. The second information may contain any of an application identifier, a time window, session and network identifiers, such as any of a Single Network Slice Selection Assistance Information (S-NSSAI), a Data Network Name (DNN) and an area of interest.

According to embodiments, the (e.g., device running) the NWDAF may subscribe to the service data from AF by invoking a Naf_EventExposure_Subscribe service (Event ID=Service Data, Event Filter information=Application ID, Target of subscription=Any WTRU). The NWDAF may send (e.g., transmit) a second request message 42a for requesting subscription to analytics in the AF involving a set of (e.g., any number of) WTRUs. The second request message 42a may include a first information indicating the type of event subscribed (e.g., Event ID) that may be set to "Service Data". The (e.g., device running) the AF may transmit a second response message 42b, for example, for acknowledging the subscription, or for notifying or sending new metrics to the NWDAF. According to embodiments, the second response message 42b may include a set (e.g., list) of identifiers of WTRUs involved in the AF for which analytics have been subscribed. The set of identifiers included in the response message 42b may be referred to herein as a Depending WTRU ID list as described in Table 4.

TABLE 4

Service Data from AF related to the
observed QoE for multiple WTRUs.

| Information | Source | Description |
|---|---|---|
| Locations of Application | AF/ NEF | Locations of application represented by a list of DNAI(s). The NEF may map the AF-Service-Identifier information to a list of DNAI(s) when the DNAI(s) being used by the application are statically defined. |
| Application ID | AF | To identify the service and support analytics per type of service (the desired level of service) |
| Service Experience | AF | Refers to the QoE as established in the SLA and during on boarding. It may be any of kind of MOS |
| Timestamp | AF | A time stamp associated with the observed level of Service Experience provided by the AF. |
| Depending WTRU ID list | AF | List of identifiers (ID) of (e.g., other) WTRUs the AF depends on. Used by NWDAF to request information from relevant NF. |

According to embodiments, for (e.g., each of) the WTRUs listed by the AF, the (e.g., device running) the NWDAF may subscribe to any of the network data described in Table 2, from a NF by, for example, invoking a Nnf_EventExposure_Subscribe service. The NWDAF may send (e.g., transmit) a third request message 43a for requesting subscription to network data related to a WTRU listed by the AF. The NWDAF may send (e.g., transmit) the third request message 43a to any number of NFs. The third request message 43a may include a first information indicating the type of event subscribed (e.g., Event ID) that may be set to "5QI_Statistics". The (e.g., device running) the NF may transmit a third response message 43b, for example, for acknowledging the subscription, or for notifying or sending new metrics to the NWDAF. According to embodiments, the third response message 43b may include any network (e.g., QoS, statistic) data related to any WTRU listed by the AF.

According to embodiments, the (e.g., device running) the NWDAF may train 44 (e.g., offline or online) a data analytics (e.g., QoE, QoS) model for the given application, which may be used to determine (e.g., estimate, predict) a data analytics (e.g., any of a QoE of the application, and a QoS configuration for the WTRU(s)). According to embodiments, in the step 44, the data analytics (e.g., QoE of the application, QoS configuration of the WTRUs) may be obtained based on an already (e.g., previously, offline) trained (QoE, QoS) model and any (e.g., network related, service service) metric received in any of the second 42b and third 43b response messages.

According to embodiments, the (e.g., device running) the NWDAF, may provide the data analytics, e.g., the observed Service Experience to the consumer NF by means of any of a Nwdaf_AnalyticsSubscription_Notify and a Nwdaf_AnalyticsInfo_Response. The NDWAF may, for example, transmit a fourth message 45 indicating whether the (e.g., used) QoS Parameters satisfy a Service MoS (e.g., agreed between the Mobile Network Operator (MNO) and the end user or between the MNO and the external Application Service Provider (ASP)). According to embodiments, the fourth message may include any of an (e.g., observed) Service Experience (e.g. averaged MOS), a spatial validity condition, (e.g., indicating where the estimated Service Experience may apply), and a time validity condition, (e.g., indicating when the estimated Service Experience may apply).

Figure 5:
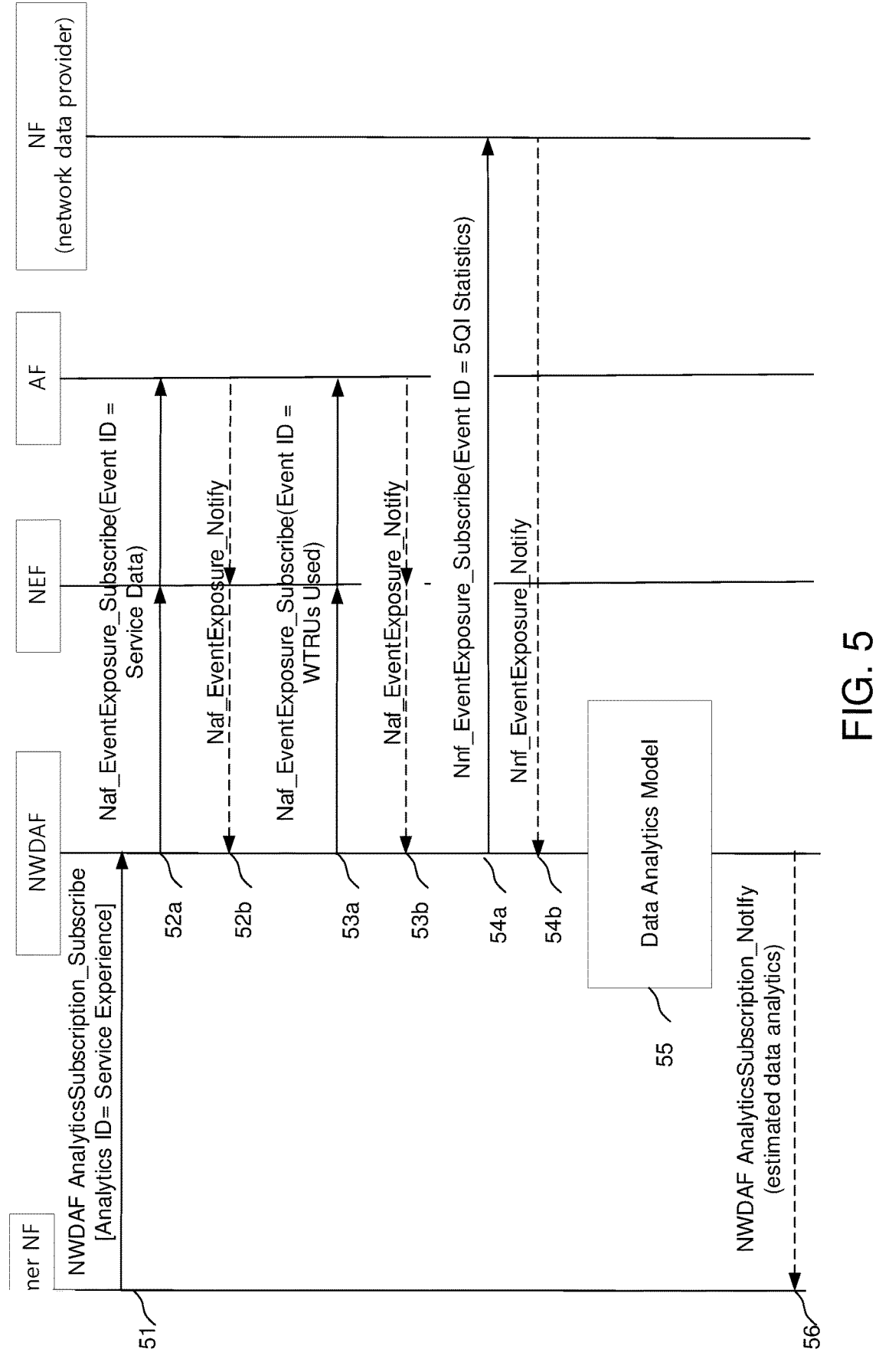
FIG. 5 is a diagram illustrating another example of a message exchange for monitoring information of a set of WTRUs.

FIG. 5 is a diagram illustrating another example of a message exchange for monitoring information of a set of WTRUs involved in an AF. In the example of FIG. 5, the first request message 51 and the second request message 52a may be similar to the first request message 2a and the second request message 2b described in FIG. 2.

According to embodiments, in response to the second request message 52a, the (e.g., device running) the AF may transmit a second response message 52b, for example, for acknowledging the subscription, or for notifying or sending new metrics to the NWDAF. The second response message 52b may not include any set (e.g., list) of identifiers of WTRUs involved in the AF for which analytics may have been subscribed. The set of WTRUs involved in the AF may be communicated to the NWDAF via a (e.g., separate) message exchange.

According to embodiments, the (e.g., device running) the NWDAF may subscribe to a list of WTRUs involved in the AF by invoking a Naf_EventExposure_Subscribe service (Event ID=WTRU used, Event Filter information=Application ID, Target of subscription=Any WTRU) service. The NWDAF may transmit a (e.g., specific) request message 53a for requesting subscription to a set of WTRUs involved in the AF. The (e.g., specific) request message 53a may include a first information indicating the type of event subscribed (e.g., Event ID) that may be set to "WTRU used". The (e.g., device running) the AF may transmit a (e.g., specific) response message 53b, for example, for acknowledging the subscription, or for notifying or sending new or updated set (e.g. lists) of identifiers of WTRUs involved in the NWDAF. According to embodiments, the (e.g., specific) response message 53b may include a set (e.g., list) of identifiers of WTRUs involved in the AF for which analytics may have been subscribed. The set of identifiers included in the response message 53b may be referred to herein as a Depending WTRU ID list as described in Table 5. According to embodiments, in case the set of WTRUs involved in the AF varies, the (e.g., specific) response message 53b may be transmitted to indicate an update of the set of WTRUs involved in the AF.

TABLE 5

| Example of data sent by the AF related to the WTRUs involved in the AF. | | |
| --- | --- | --- |
| Information | Source | Description |
| Locations of Application | AF/ NEF | Locations of application represented by a list of DNAI(s). The NEF may map the AF-Service-Identifier information to a list of DNAI(s) when the DNAI(s) being used by the application are statically defined. |
| Application ID | AF | To identify the service and support analytics per type of service (the desired level of service) |
| Timestamp | AF | A time stamp associated with the list of WTRUs used by the AF to provide the service. |
| Depending WTRU ID list | AF | List of identifiers (ID) of (e.g., other) WTRUs the AF depends on. Used by NWDAF to request information from relevant NF. |

According to embodiments, the third request message 54a, the third response message 54b, the data analytics (e.g., QoE, QoS) model (e.g., training) 55 and the fourth message 56 may be similar to respectively the third request message 43a, the third response message 43b, the data analytics (e.g., QoE, QoS) model (e.g., training) 44 and the fourth message 45 described in FIG. 4. As described in FIG. 4, the fourth message 56 may include a data analytics obtained on an (e.g., already trained) model, According to embodiments, a (e.g., dedicated) NWDAF may be used to track the set of WTRUs involved in an AF. Collecting Information on Individual Contributions of WTRUs to a QoE According to embodiments, individual contributions of WTRUs to the QoE of an AF involving multiple WTRUs may be quantified as individual metrics. For example, an AF may provide (e.g., transmit to) the NWDAF with individual metrics, wherein an individual metric may quantify the contribution of a single WTRU to the QoE of an AF involving multiple WTRUs. The individual metrics values may be, for example, obtained (e.g., computed) by the AF, and transmitted to the NWDAF. In another example, an individual metric related to a WTRU may be obtained (e.g., computed) by a network element based on network data (e.g., any kind of QoS metric related to that WTRU. The network element may be the WTRU or a different network element. According to embodiments, the network element (e.g., that may be computing an individual metric) may run or may not run the AF. According to embodiments, the network element may or may not run a NWDAF.

For example, an individual metric value, obtained by the AF for a WTRU, may be related to a set of (e.g., minimum) values of a set of (e.g., QoS, low level) parameters/metrics of the WTRU which may enable a (e.g., minimum) level of QoE for the AF. As previously described, the QoE may be a MOS, for example, based on a model, mapping a set of low-level parameters/metrics (such as any of latency, jitter, CPU load, page load time, network throughput, video resolution, video coding rate, number of resolution changes, audio coding rate, game lag etc.) to a MOS. A MOS model may include parameters/metrics coming from any number of WTRUs. The MOS model may be used by the AF to compute a MOS based on a set of low-level parameters/metrics. The MOS model may also be used by the AF to determine the set of values and parameters for (e.g., each of) the WTRUs that may enable a MOS (e.g., above or equal a given score). This set of values and parameters may be defined, for example, during the implementation phase of the application, or learned via, for example, a machine learning algorithm during deployment.

In a first example, an individual metric value may be a boolean indicating whether the (e.g., QoS, low level) parameters/metrics of the WTRU may enable the AF to reach a target level of QoE, or not.

In a second example, an individual metric value of a WTRU may be a percentage value (e.g., between 0 and 100), indicating how close the (e.g., QoS, low level) parameters/metrics of the WTRU are to the set of values that may enable the AF to reach a target level of QoE.

In a third example, an individual metric value of a WTRU may be as in the second example, where values greater than 100 may indicate that the current (e.g., QoS, low level) parameters/metrics of the WTRU may be better than the values that may enable the AF to reach a target level of QoE.

In a fourth example, an individual metric value of a WTRU may be a QoE that the AF would gain if the WTRU had infinite QoS/resources. In other words, the individual metric value may be the difference between the (e.g., current) QoE of the AF and a QoE of the AF if the WTRU has no communication limit and/or infinite resources.

In a fifth example, an individual metric value of a WTRU may be a decrease of the QoE that may happen if the WTRU disappears or loses communication. Any combination of the above examples may be applicable to the embodiments described herein.

According to an illustrative example, in a VR gaming AF involving two WTRUs (e.g., as headsets), latency may decrease the gaming QoE. An impact of a latency L may be quantified by a parametric function of the latency, wherein the parameters of the parametric function may depend on the type of game. An example of such a parametric function may be given by the following formula:

$$f(L)=a/(1+\exp(b-cL))-d$$

where a, b c and d may be constants depending on the type of game played. In this example, if the two WTRUs communicate via device to device communication, the latency L of the communication between both devices may be a sum of individual latencies (e.g., L=L1+L2). The individual metric value for one of the WTRU (e.g., WTRU(i)) may be, for example, the QoE that the AF would gain if the WTRU had infinite QoS (e.g., $f(L)-f(L-Li)$. The individual metric value for one of the WTRUs (e.g., WTRU(i)) may be the difference of the impact of latency L with the impact of (e.g., only) the latency of the other WTRU in the device to device communication.

In another example, the individual metric value for a WTRU may be the derivative of the impact function with respect to the individual latency of that WTRU.

Any method for obtaining an individual impact of a WTRU with regards to a given QoS parameter of that WTRU on a global QoE may be applicable to the embodiments described herein.

According to embodiments, the individual metric values may be included in the service data information of a message response sent by the AF to the NDWAF, possibly via the NEF. For example, referring to FIG. 4 the individual metric values may be included in the Naf_EventExposure_Notify message 42b. The individual metric values may be included in the Service data information as described in Table 6. Table 6 is a modified version of Table 4.

TABLE 6

Service Data from AF related to the observed QoE for multiple
WTRUs, including individual WTRU contribution.

| Information | Source | Description |
|---|---|---|
| Locations of Application | AF/ NEF | Locations of application represented by a list of DNAI(s). The NEF may map the AF-Service-Identifier information to a list of DNAI(s) when the DNAI(s) being used by the application are statically defined. |
| Application ID | AF | To identify the service and support analytics per type of service (the desired level of service) |
| Service Experience | AF | Refers to the QoE as established in the SLA and during on boarding. It may be any kind of MOS |
| Timestamp | AF | A time stamp associated with the observed level of Service Experience provided by the AF |
| Depending WTRU ID list | AF | List of identifiers (ID) of (e.g., other) WTRUs the AF depends on. Used by NWDAF to request information from relevant NF. |
| Contributions of individual WTRU | AF | List of individual QoE contributions by each WTRU. Quantifies the contribution of each WTRU to the Service experience |

According to embodiments, and for example, referring to FIG. 5 the individual metric values may be in included in the Naf_EventExposure_Notify message 53*b*. The individual metric values may be included in the used data information as described in Table 7. Table 7 is a modified version of Table 5.

TABLE 7

Used Data from AF related to the WTRUs involved in
the AF, including individual WTRU contribution.

| Information | Source | Description |
|---|---|---|
| Locations of Application | AF/ NEF | Locations of application represented by a list of DNAI(s). The NEF may map the AF-Service-Identifier information to a list of DNAI(s) when the DNAI(s) being used by the application are statically defined. |
| Application ID | AF | To identify the service and support analytics per type of service (the desired level of service) |
| Timestamp | AF | A time stamp associated with the list of WTRUs used by the AF to provide the service. |
| Depending WTRU ID list | AF | List of identifiers (ID) of (e.g., other) WTRUs the AF depends on. Used by NWDAF to request information from relevant NF. |
| Contributions of individual WTRU | AF | List of individual QoE contributions by each WTRU. Quantifies the contribution of each WTRU to the Service experience |

According to embodiments, the information indicating individual contributions of WTRUs may be transmitted as any of a single list of pairs of (a WTRU identifier and an individual metric value of that WTRU), two lists respectively including WTRU identifiers and corresponding individual metric values. Any encapsulation technique allowing to transmit individual contributions of WTRUs to a QoE may be applicable to the embodiments described herein.

According to embodiments, the information indicating individual contributions of WTRUs may be forwarded (e.g., transmitted) or made available (e.g., transmitted upon request) to any NF such as a PCF.

Service Experience Analytics Based on WTRU Data

According to embodiments, (e.g., enriched, observed) service experience predictions may be provided by the (e.g., device running the) NWDAF based on input data collected from the WTRUs involved in a multi-WTRU application. Input data may be any of service and network data. Service data may be collected from an AF. Network data may be collected from any of a NF and OAM.

For example, input data may be collected from a WTRU and may include any of a QoS metric associated with the WTRU and an individual contribution (e.g., metric) of that WTRU to the overall application service experience (e.g., QoE of an AF involving multiple WTRUs).

According to embodiments the (e.g., device running the) NWDAF may receive a request for service experience analytics from, for example, a consumer NF (e.g. any of OAM, PCF). For example, the (e.g., device running the) NWDAF may obtain the list of identifiers of the WTRUs involved in the application, according to any embodiment described herein. The list (e.g., set, group) of WTRU IDs may be, for example, associated with the AF.

According to embodiments, the (e.g., device running the) NWDAF may obtain input data from a (e.g., each) WTRU involved in the multi-WTRU application, for example via OAM services. The WTRU input data may include an individual contribution to the QoE according to any embodiment described herein, e.g., associated with any QoS metric. Table 8 describes an example of WTRU input data collected by the NWDAF. For example, the (e.g., device running the) NWDAF may be configured to invoke (e.g., use) any OAM services to retrieve the management data that may be relevant to analytics generation. OAM services may include 3GPP OAM services or any other type of OAM service. For example, the (e.g., device running the) NWDAF may be configured to use OAM for collecting input data related to a (e.g., single) WTRU via minimization of drive test (MDT) based retrieval of information. MDT may be seen as a method enabling a WTRU to perform and to report (e.g., network coverage) measurements. For example, a data volume may be measured separately (e.g., independently) for DL and UL, e.g., per QoS. In another example, throughput may be measured separately (e.g., independently) for DL and UL, per radio access bearer. In yet another example, any of a reference signal received power, a reference signal received quality may be measured. In yet another example, packet delay measurement may be performed separately (e.g., independently) for DL and UL, e.g., per QoS class identifier etc. According to embodiments, any QoS metric described herein may be reported (e.g., transmitted) by the WTRU to the (e.g., device running the) NWDAF via MDT based information retrieval independently from their measurements (e.g., by the WTRU).

TABLE 8

Example of WTRU input data

| Information | Source | Description |
|---|---|---|
| Application ID | NEF/AF | Identifying the application providing this information |
| List of WTRU IDs (1 . . . n) | NEF/AF | List of WTRU IDs involved in the same application |
| >QoS | WTRU (e.g., via MDT) | QoS metric(s) from WTRU |
| >Service experience contribution | WTRU (e.g., via AF) | Individual (e.g., score/weight of a WTRU's) contribution to global service experience |

Figure 8:
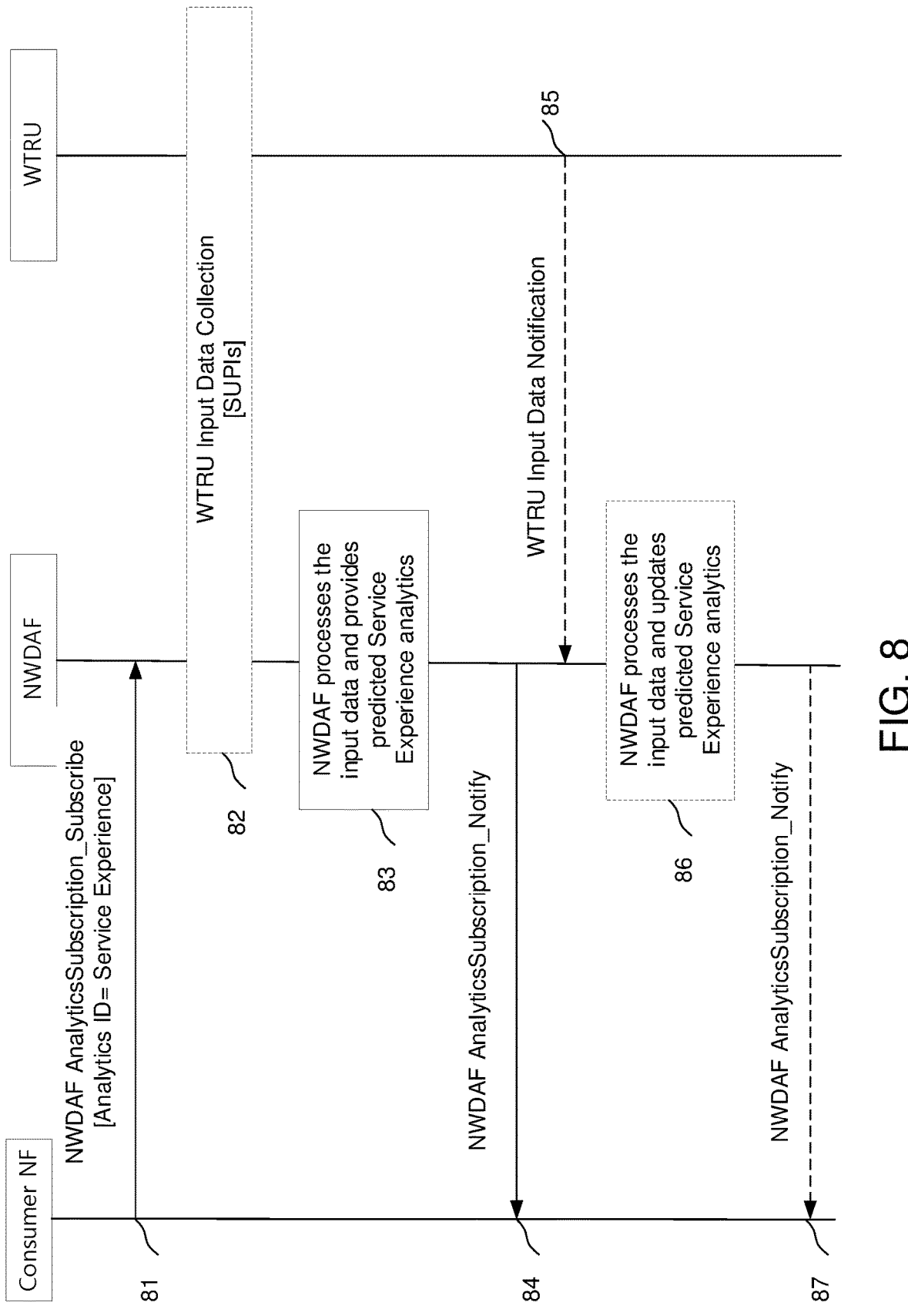
FIG. 8 is a diagram illustrating an example of a message exchange for collecting WTRU input data for service experience analytics.

FIG. 8 is a diagram illustrating an example of a message exchange for collecting WTRU input data for service experience analytics (e.g., predictions).

According to embodiments, a (e.g., device running a) consumer NF may send (e.g., transmit) a subscription message 81 to (e.g., a device running) the NWDAF for subscribing to service experience analytics by, for example, invoking any of a Nwdaf_AnalyticsSubscription_Subscribe and a Nwdaf_AnalyticsInfo_Request service. The subscription message 81 may include a first information indicating the type of analytics requested (e.g., Analytics ID) that may be set to "Service Experience". The subscription message 81 may include a second information allowing to filter/select the metrics. The second information may contain any of an application identifier (ID) and a time window representing the analytics target period. The time window may be set, for example, to a time period in the future to obtain analytics predictions. In another example, the time window may be set to a time period in the past to obtain analytics statistics.

According to embodiments, in a step 82, the (e.g., device running the) NWDAF may collect input data from (e.g., each) individual WTRU involved in the AF based on for example an MDT based information retrieval.

According to embodiments, in a step 83, the (e.g., device running the) NWDAF may process the collected input data, for example, based on any embodiment described herein. For example, the (e.g., device running the) NWDAF may obtain a service experience prediction for a future time period based on the collected input data and an (e.g., already trained) QoE model.

According to embodiments, the (e.g., device running) the NWDAF, may provide the data analytics (e.g., the predicted service experience) to the consumer NF by means of any of a Nwdaf_AnalyticsSubscription_Notify and a Nwdaf_AnalyticsInfo_Response. The NDWAF may, for example, transmit a notification message 84 indicating predicted service experience for the application. Table 9 describes an example of parameters included in the notification message 84.

TABLE 8

| Example of WTRU input data | |
|---|---|
| Information | Description |
| Application ID | Identifying the application providing this information |
| Service experience | Observed service experience predictions |

According to embodiments, the service experience may include any of a service experience type (e.g., any of voice, video, other), a service experience over the analytics target period (e.g., any of average, variance), a list of identifiers of the WTRUs involved in the application service experience (e.g., subscription permanent identifiers (SUPIs)), an estimated percentage of WTRUs with similar service experience, a spatial validity (e.g., an area where the estimated service experience may apply), a validity period, and a probability assertion (e.g., representing a confidence of the prediction). According to embodiments, the (e.g., device running the) NF consumer function may subscribe to receive continuous reporting of service experience analytics (e.g., via the subscription message 81). The (e.g., device running the) NWDAF may receive further WTRU input data 85 from (e.g., each) individual WTRU involved in the AF based on, for example, MDT based information retrieval. In a step 86, the (e.g., device running the) NWDAF may generate further analytics and may provide them to e.g., device running the)

NF consumer function via a further notification message 87 (e.g., similar to the notification message 84 with updated parameter values).

Estimating a QoE Based on a QoS Configuration

According to embodiments, the (e.g., device running the) NWDAF may collect information that may be used for improving the QoE for an AF. This information may be made available to consumer NF (e.g., the PCF) which may update (e.g., policy) decisions for improving the QoE.

Embodiments described herein may also be applicable to an AF involving a single WTRU.

Figure 6:
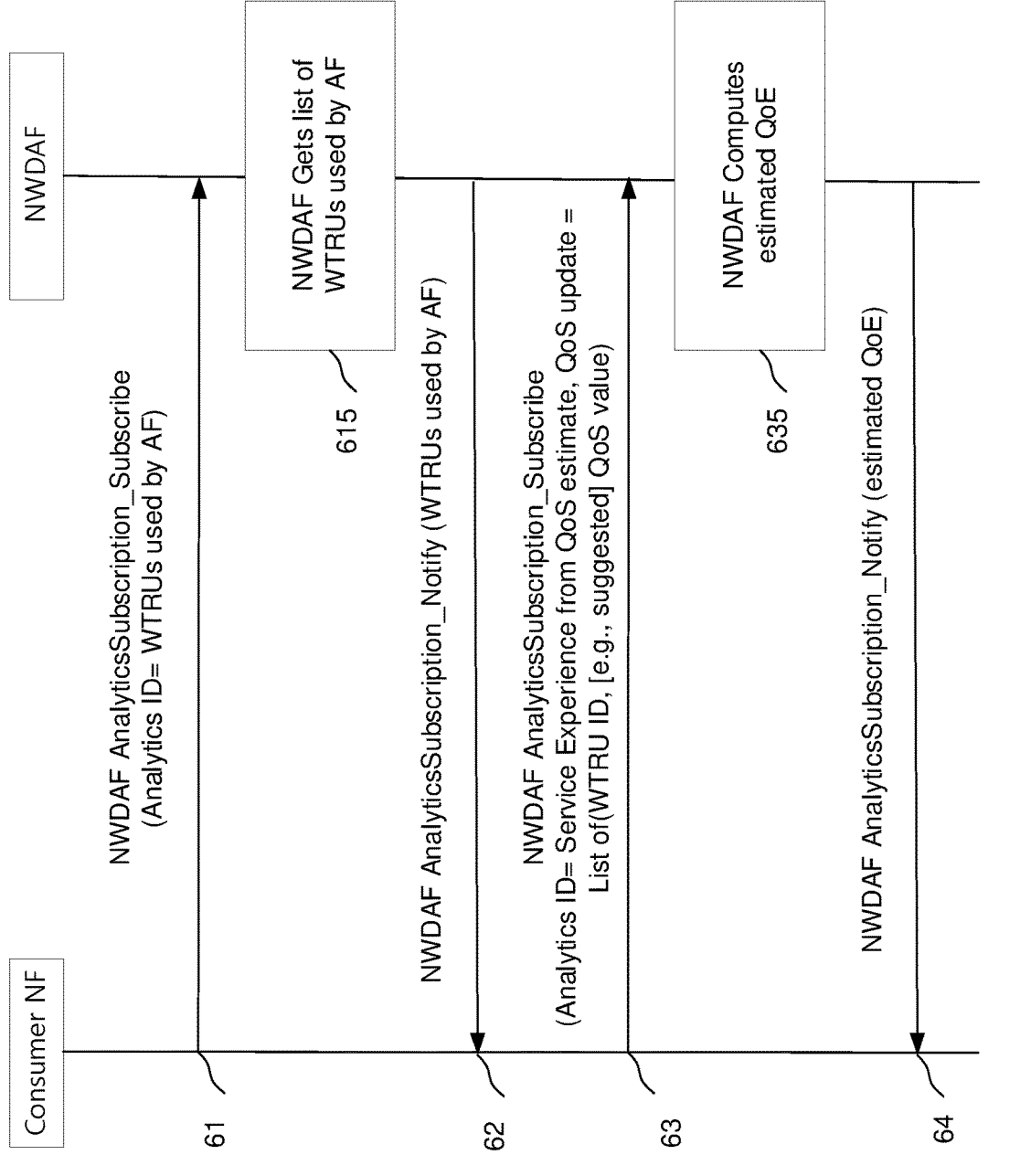
FIG. 6 is a diagram illustrating an example of a message exchange for estimating a QoE based on a WTRU (e.g., QoS) configuration.

FIG. 6 is a diagram illustrating an example of a message exchange for estimating a QoE based on a WTRU (e.g., QoS) configuration.

According to embodiments, the (e.g., device running the) NWDAF may be queried by (e.g., receive a request from) a NF with a (e.g., potential) modification of the QoS (or any other parameter or combination of parameters) of WTRUs involved in the AF. The (e.g., device running the) NWDAF may answer with (e.g., transmit) an estimation of the QoE that would result from this modification.

According to embodiments, a (e.g., device running a) consumer NF may send (e.g., transmit) a first request message 61 to (e.g., a device running) the NWDAF, for requesting the (e.g., set of) WTRU(s) involved in the AF by, for example, invoking any of a Nwdaf_AnalyticsSubscription_Subscribe and a Nwdaf_AnalyticsInfo_Request service. The service may be, for example, invoked as follows: (Analytics ID="WTRUs used by AF", Analytic Filter information=(Application ID, time window, S-NSSAI, DNN, Area of Interest)). The first request message 61 may include a first information indicating the type of analytics requested (e.g., Analytics ID) that may be set to "WTRUs used by AF". The request for involved WTRU(s) may include a second information allowing to filter/select the parameters. The second information may contain any of an application identifier, a time window, session and network identifiers, such as any of a Single Network Slice Selection Assistance Information (S-NSSAI), a Data Network Name (DNN) and an area of interest. In a step 615, the (e.g., device running the) NWDAF may retrieve the list of WTRUs involved in the AF according to any embodiments described herein.

According to embodiments, in response to the first request message 61, the (e.g., device running) the (e.g., device running the) NWDAF may transmit a first response message 62, including a (e.g., set of) identifier(s) of WTRU(s), by invoking any of a Nwdaf_AnalyticsSubscription_Notify and a Nwdaf_AnalyticsInfo_Response service. The (e.g., set of) identifier(s) of WTRU(s) included in the first response message 62 may correspond to a set of WTRUs (e.g., estimated to be) involved in the AF, for example, during the time window requested by the NF.

According to embodiments, a (e.g., device running a) consumer NF may send (e.g., transmit) a second request message 63 to (e.g., a device running) the NWDAF, for requesting data analytics by, for example, invoking any of a Nwdaf_AnalyticsSubscription_Subscribe and a Nwdaf_AnalyticsInfo_Request service. The service may be, for example, invoked as follows: (Analytics ID="Service Experience from QoS estimate", Analytic Filter information=(Application ID, time window, S-NSSAI, DNN, Area of Interest), QoS update=List of (WTRU ID, [suggested] QoS value)). The second request message 63 may include a first information indicating the type of analytics requested (e.g., Analytics ID) that may be set to "Service Experience from QoS estimate". The request for analytics may include a second information allowing to filter/select the parameters.

The second information may contain any of an application identifier, a time window, session and network identifiers, such as any of a Single Network Slice Selection Assistance Information (S-NSSAI), a Data Network Name (DNN), and an area of interest. The request for analytics may include a third information allowing to indicate a QoS configuration of (e.g., a set of) WTRU(s) for which an estimated QoE may be requested. The QoS configuration may be transmitted as (e.g., a set of) WTRU(s) ID(s), wherein a set of (e.g., low level, QoS parameter) values may be associated with (each of) the WTRU(s) ID(s). For example, a QoS parameter associated with a WTRU ID may be a QoS value that the PCF may be considering assigning to the WTRU.

According to embodiments, in a step 635, the (e.g., device running) the NWDAF may obtain (e.g., compute) the estimated QoE value that may be reachable if the received QoS configuration may be applied.

According to embodiments, the (e.g., device running) the NWDAF may transmit a second response message 64, including a (e.g., range of) QoE value(s) obtained (e.g., estimated) based on the received QoS configuration of WTRU(s), by invoking any of a Nwdaf_AnalyticsSubscription_Notify and a Nwdaf_AnalyticsInfo_Response service. The second response message 64 may include information indicating, for example, how well the proposed QoS configuration may be estimated to satisfy a QoE (e.g., as agreed between the MNO and the end user or between the MNO and the external ASP). The information may indicate, for example, any of an estimated Service Experience (e.g. average MOS), a spatial validity condition (e.g., where the estimated MOS may apply), a time validity condition (e.g., when the estimated MOS may apply).

Obtaining a QoS Configuration for a (e.g., Targeted) QoE

Figure 7:
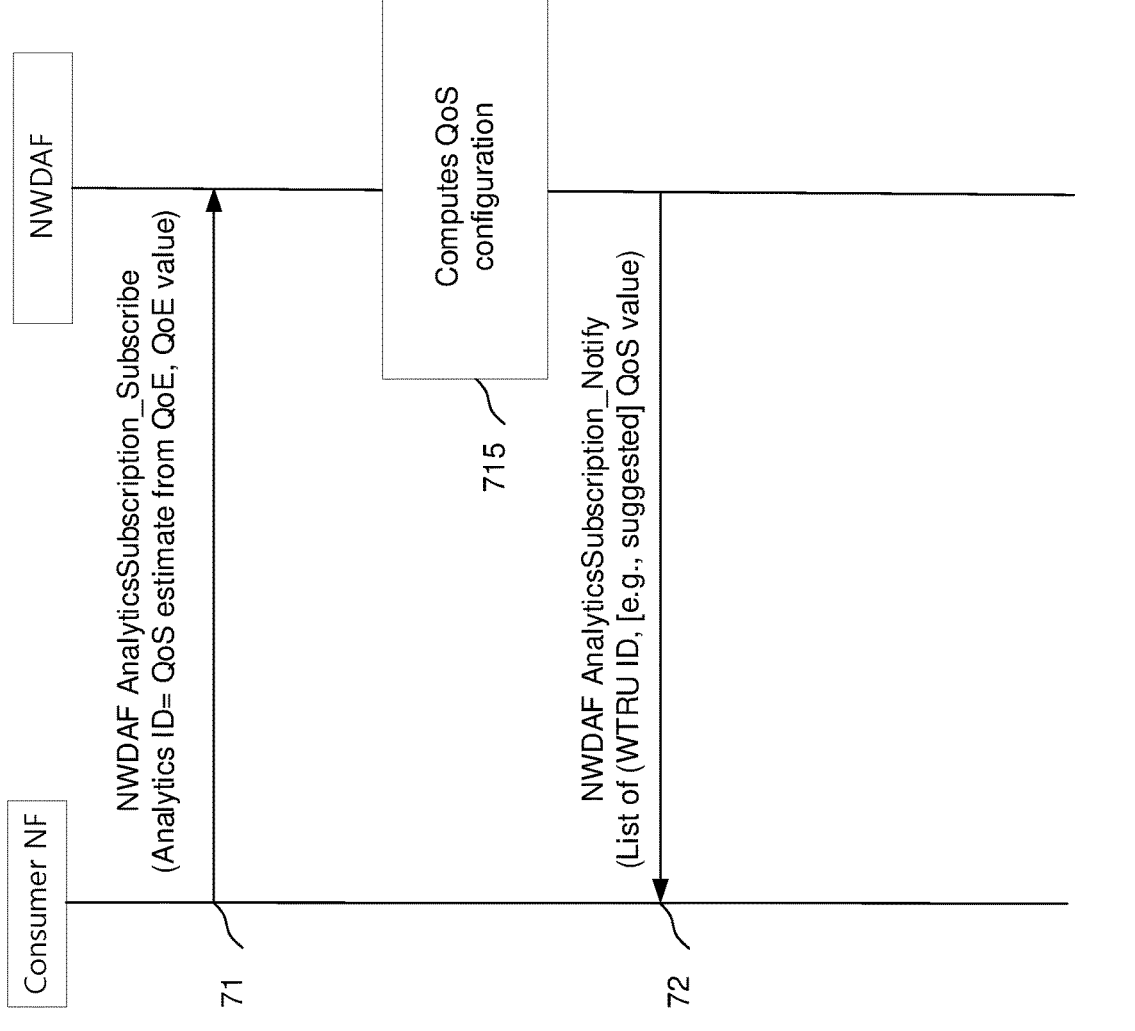
FIG. 7 is a diagram illustrating an example of a message exchange for obtaining a QoS configuration for a target QoE.

FIG. 7 is a diagram illustrating an example of a message exchange for obtaining a QoS configuration based on a targeted QoE. The (e.g., device running the) NWDAF may be queried with (e.g., receive a request including) a QoE, that, for example the NF may target for the AF. The (e.g., device running the) NWDAF may answer with a (e.g., suggested) QoS (or any other parameter or combination of parameters) for (e.g., each of the) WTRU(s) that may be involved in the AF. Embodiments described herein may also be applicable to an AF involving a single WTRU.

According to embodiments, a (e.g., device running a) consumer NF may send (e.g., transmit) a request message 71 to (e.g., a device running) the NWDAF, for requesting data analytics by, for example, invoking any of a Nwdaf_AnalyticsSubscription_Subscribe and a Nwdaf_AnalyticsInfo_Request service. The service may be, for example, invoked as follow: (Analytics ID="QoS estimate from QoE", Analytic Filter information=(Application ID, time window, S-NSSAI, DNN, Area of Interest), QoE). The request message 71 may include a first information indicating the type of analytics requested (e.g., Analytics ID) that may be set to "QoS estimate from QoE". The request for analytics may include a second information allowing to filter/select the parameters. The second information may contain any of an application identifier, a time window, session and network identifiers, such as any of a Single Network Slice Selection Assistance Information (S-NSSAI), a Data Network Name (DNN), and an area of interest. The request for analytics may include a third information allowing to indicate a (e.g., targeted, range of) QoE, for which a QoS configuration may be requested.

According to embodiments, a QoS configuration may be obtained in a step 715 based on the requested (e.g., targeted, range of) QoE. For example, the QoS configuration may be obtained by requesting (e.g., invoking) a function based on only a (e.g., targeted, range of) QoE. In another example, the QoS configuration may be obtained by requesting (e.g., invoking) a function based on a (e.g., targeted, range of) QoE and network data related to the (e.g., set of) WTRU(s) involved in the application. The network data may be received according to any embodiment described herein and may comprise any QoS metric according to any embodiment described herein. In yet another example, the QoS configuration may be obtained by requesting (e.g., invoking) a function based on a (e.g., targeted, range of) QoE and any individual contribution metric of any WTRU of the (e.g., set of) WTRU(s) involved in the application. The individual contribution metric(s) may be included in service data, that may be received according to any embodiment described herein.

According to embodiments, the (e.g., device running) the NWDAF may transmit a response message 72, including the requested data analytics such as, for example, a QoS configuration for (e.g., a set of) WTRU(s) that may be involved in the AF. The QoS configuration may enable the AF to reach the requested (e.g., targeted, range of) QoE. The response message 72 may be transmitted by invoking any of a Nwdaf_AnalyticsSubscription_Notify and a Nwdaf_AnalyticsInfo_Response service. The QoS configuration may be transmitted as (e.g., a set of) WTRU(s) ID(s), wherein a set of (e.g., low level, QoS parameter) values may be associated with (each of) the WTRU(s) ID(s).

According to embodiments, the QoS configuration may, for example, include (e.g., specific) values for any of the following parameters of the service: a data volume (e.g., separately for DL and UL or in total), a throughput (e.g., separately for DL and UL or in total), for example, per any of radio access bearer and UL radio network controller, a minimum expected signal quality (such as, e.g. minimum expected RSRP, RSRQ), a packet delay, (e.g., separately for DL and UL or in total), a packet loss rate (e.g., separately for DL and UL or in total), a priority, etc. A QoS configuration may also include a QoS class identifier (QCI) that may represent QoS categories. A QoS category may, for example, have any of a priority, a packet delay budget, and a packet loss rate etc.

According to embodiments, the function that may be requested (e.g., invoked, used) based on at least a (e.g., targeted, range of) QoE, may be any of a look-up table, an optimization algorithm and a machine learning model. For determining the QoS configuration, the function may use, in addition to the requested (e.g., targeted, range of) QoE, input data that may be associated with the application. For example, input data may include any network data related to the any WTRU(s) involved in the application according to any embodiment described herein. For example, input data may include any individual contribution metric of any WTRU(s) involved in the application according to any embodiment described herein. For example, input data may include any filter value provided in the request for data analytics, such as any of a time window, session and network identifiers, a single network slice selection assistance information (S-NSSAI), a data network name (DNN), and an area of interest. Input data may include information about the WTRU(s) involved in the application, such as, for example, a location, DNN, S-NSSAI, IP filter information, QFI, number of packet transmission and/or retransmissions, ID of the WTRU(s), type of the WTRU(s), ID of the owner(s) etc. Input data may include information about the AF, such as, for example, any of a location, timestamp, application ID, current QoE, type of application etc.

In a first variant, the function that may be requested based on at least a (e.g., targeted, range of) QoE, may be a look-up table, that may map a (e.g., range of) QoE value to a QoS configuration for an (e.g., each AF). For example, a look-up table may store (e.g., previous) QoS configurations that may have allowed to reach a (e.g., range of) QoE value for a type of AF. For example, in addition to the QoE value, the look-up table may associate with a (e.g., given QoS configuration) any additional network parameter related to a WTRU involved in the application and/or any individual contribution to the QoE, that may have allowed to reach a (e.g., range of) QoE value. For example, the look-up table may map any input data and a (e.g., range of) QoE value to a QoS configuration by type of WTRU. The look-up table may be searched for the entry that may be the closest to the (e.g., input data) and target QoE, and the corresponding QoS configuration for (e.g., each of) the WTRU(s) involved in the AF may be retrieved e.g., based on a WTRU type. In the same example, the look-up table may be searched for several entries and (e.g., all) the QoS configurations associated with these entries may be retrieved. The (e.g., returned) QoS configuration may, for example, be computed by any of averaging the retrieved QoS configurations, using the median values, counting the QoS configurations that have the same values (or by counting the values of the fields of the QoS configuration) and using the values that may achieve the highest count, using the QoS configurations that may be the least different with respect to the current QoS configurations of the WTRU(s) involved in the AF. Any other aggregation techniques may be applicable to embodiments described herein.

In a second variant, the function that may be requested based on at least a (e.g., targeted, range of) QoE, may be an optimization algorithm coupled to an (e.g., any of analytical, machine learning) model for obtaining a QoE based a QoS configuration (e.g., and on any additional input data as described herein). The model may be, for example, a model that may be used in the step 635 of the method described in FIG. 6, where a QoE may be computed based on e.g., any of QoS metrics and QoS configurations. An optimization algorithm may be used to obtain a QoS configuration of the (set of) WTRU(s) involved in the AF based on that model. For example, the optimization algorithm may be used to obtain any of the best QoS configuration (e.g., allowing to reach the highest QoE), one QoS configuration satisfying the requested QoE, one (e.g., of the) QoS configuration(s) satisfying the requested QoE and being the closest to the current QoS configuration(s). For example, the (e.g., any of analytical, machine learning) model may be differentiable, and a gradient descent algorithm may be executed to obtain the QoS that may reach the requested QoE value. In another example, any of genetic algorithms, sampling-based methods, simulated annealing may be used as optimization algorithms coupled to a model allowing to determine a QoE based on a QoS configuration.

In a third variant, the function that may be requested based on at least a (e.g., targeted, range of) QoE, may be a machine learning model mapping (e.g., any input data and) a target QoE to QoS configurations. The model may have been preliminary trained (e.g., offline). The machine learning model may be based on any of decision trees, random forests, learning regression, boosting, bagging, deep neural network, support vector machines, nearest neighbor, etc.

According to embodiments, individual contribution metrics to a QoE may be used to obtain a QoS configuration. For example, the (e.g., device running the) NWDAF may obtain a new QoS configuration for (e.g., only) the WTRUs whose individual contributions may indicate they may not meet the target level of QoE. For example, the (e.g., device running the) NWDAF may use these individual contributions to rank the WTRUs by individual contribution (or lack thereof) and may go through the WTRUs in order, computing a new QoS configuration for a (e.g., each) WTRU until the requested QoE may be reached. Any technique taking individual contributions to QoE into account for determining the QoS configuration may be applicable to embodiments described herein.

According to embodiments, the examples of Nwdaf_AnalyticsSubscription_Subscribe and Nwdaf_AnalyticsSubscription_Notify messages have been used to describe how to request (e.g., subscribe) and receive (e.g., be notified of) data analytics, as illustrated in FIG. 4 to FIG. 8. Although not explicitly illustrated in FIG. 4 to FIG. 8, Nwdaf_AnalyticsInfo_Request and Nwdaf_AnalyticsInfo_response messages may be used to respectively request and receive data analytics according to any embodiment described herein.

Example of an Application Function in a Home Network

The example of an AF in a home network will be described herein with reference to FIG. 3 to FIG. 7. Network apparatuses (such as e.g., routers, extenders) may run NFs configured to transmit to the (e.g., home) gateway, messages 41, 51, 61 (e.g., data, packets) including a subscription request for an (e.g., estimated) QoE/service experience for a (e.g., given) application. The subscription request may include a request for a list of WTRUs used by the (e.g., given) application.

The home gateway, for example executing a NWDAF, may send a message 42a, 52a containing a request for subscription to metrics related to the application to a game console (for example running the application). The home gateway may send the message 42a, 52a to the game console, for example, upon reception of the subscription message 41 from the network apparatus.

The game console may transmit to the home gateway messages 42b, 53b containing metrics and measurements related to the QoE of the application. These metrics may include, for example, any of a resolution of a rendered video stream, a precision and confidence of user localization within the home, and a time (e.g., latency) for sending video portions to other (e.g., end-devices) WTRUs. The game console may transmit the messages 42b, for example upon reception of the subscription message 42a, 52a from the home gateway, and/or when (e.g., new) applicative data may become available (e.g., updated). According to embodiments, the messages 42b, 53b may include (e.g., a list, set of) identifiers of (e.g., all) the WTRUs that the application may be aware of and that may be contributing to the application. For example, this list may include the identifiers (such as any of a MAC address, a subscription permanent identifier (SUPI)) of any of sensors and cameras that may be sending data to the game console. This list may also include the identifiers of WTRUs that render the video stream generated by the game console.

According to embodiments, the messages 42b, 53b may include for (e.g., each of the) WTRUs identified in the list a number indicating the impact of the WTRU on the QoE, according to the application. This number may, for example, be a boolean indicating whether the WTRU may be (e.g., fully) satisfying a target set by the application or a percentage between 0 and 100, indicating how close the WTRU may be to (e.g., fully) satisfy a target set by the application.

The home gateway may transmit messages 43a, 54a containing a request for subscription for metrics related to the application to network apparatuses (such as routers, extenders). According to embodiments, the messages 43a, 54a may include (e.g., a list, set of) identifier(s) of (e.g., all) the WTRUs. For example, this list may be identical to the list transmitted by the game console or may be derived from that list (e.g. a subset or an intersection with another list). According to embodiments, a network apparatus may transmit a message to the home gateway containing the metrics (e.g. any of signal strength, throughput, latency . . . ) for a (e.g., certain) WTRU, for example upon reception of the subscription message 43a, 54a from the home gateway, and/or when new data/metrics related to a WTRU in that list may become available.

The home gateway may obtain 44, 55 (determine, compute) any of a service experience, QoE score, based on any of the messages and metrics received from the game console and the network apparatuses.

The home gateway may transmit a message 45, 56, 61 to the network apparatus, having sent the subscription request message 41, 51, 62. The transmitted message 45, 56 may include the obtained service experience. According to embodiments, these messages 42b, 43a, 43b, 45, 53b, 54a, 54b, 55, 56, 62 may include (e.g., a list, set of) identifier(s) of (e.g., all) the WTRUs that the application may be aware of and that may be contributing to the application.

A network apparatus may send a message 63 to the home gateway containing a (e.g., suggested) QoS (e.g. any of an allocation of traffic bandwidth, a flow priority etc.) for (e.g., one of) the WTRUs in a previously received WTRU list. The home gateway may reply with a message containing a QoE that may be obtained for the application if the (e.g., suggested) QoS is used.

A network equipment may send a message 71 to the home gateway containing a (e.g., target) QoE. The home gateway may reply with a message 72 containing a QoS configuration (e.g., a list of (QoS suggested parameter, WTRU identifiers) that may enable the AF to reach the (e.g., target) QoE.

FIG. 9 is a diagram illustrating an example of a method 900 for obtaining a QoE value. According to embodiments, in a step 910, a first request signal may be transmitted for subscribing to a service data of (e.g., related to) an application. In a step 920, a first response signal may be received. The first response signal may comprise at least one identifier of at least one WTRU involved in the application. The first response signal may further comprise at least one indication of at least one individual contribution of the at least one WTRU to a QoE of the application. According to embodiments, in a step 930, a second request signal may be transmitted for subscribing to a network data from a network function. For example, the network data may be related to the at least one WTRU and e.g., to the application. According to embodiments, in a step 940, a value of the QoE of the application may be obtained based on the received first and second response messages.

According to embodiments, a QoE model may be trained based on the received first and second response messages.

According to embodiments, a third request signal for estimating a QoE value of the application may be received. The third request signal may comprise, for example, a QoS configuration, based on which a QoE value estimation may be requested. According to embodiments, a third response signal may be transmitted. The third response signal may comprise the QoE value obtained based on the QoS configuration, the received first response message and the received second response message.

According to embodiments, a fourth request signal requesting for a QoS configuration may be received. The fourth request signal may comprise a target QoE value, based on which the QoS configuration may be requested. The requested QoS configuration may allow to reach the target QoE. According to embodiments, a QoS configuration may be obtained based on the target QoE value, the received first response message and the received second response message. A fourth response signal comprising the obtained QoS configuration may be transmitted.

FIG. 10 is a diagram illustrating an example of a method 1000 for obtaining a QoS configuration. According to embodiments, in a step 1010, a request message may be received. The request message may request a QoS configuration related to at least one WTRU, involved in an application for obtaining a target QoE of the application. According to embodiments, in a step 1020, a QoS configuration may be obtained based on the target QoE. The QoS configuration may be transmitted e.g., in response to the request message.

According to embodiments, a plurality of WTRUs may be involved in the application. The obtained QoS configuration may be related to (e.g., any WTRU of) the plurality of WTRUs.

According to embodiments, a subscription message for subscribing to the service data related to the application may have been transmitted e.g., before obtaining the QoS configuration.

According to embodiments, a subscription response message comprising a plurality of identifiers of respectively the plurality of WTRUs involved in the application may be received e.g., in response to the subscription message and e.g., before obtaining the QoS configuration.

According to embodiments, network data related to the plurality of WTRUs may be received. For example, the QoS configuration may be obtained (e.g., computed) further based on the received network data.

According to embodiments, service data related to the application may be received e.g., before obtaining the QoS configuration. The service data may comprise individual contribution metrics of the WTRUs to a QoE of the application. An individual contribution metric of a WTRU may quantify an individual contribution of the WTRU to the QoE. For example, the QoS configuration may be obtained further based on the individual contribution metrics of the WTRUs.

According to embodiments, the individual contribution metric of the WTRU may be received from a network element, different from the WTRU. The network element may be executing an application function associated with the application.

According to embodiments, the individual contribution metric of the WTRU may be received from the WTRU.

According to embodiments, the network data related to the WTRUs may comprise any QoS metrics related to WTRUs, that may be received, for example from the WTRU.

FIG. 11 is a diagram illustrating an example of a method 1100 for obtaining a data analytics. According to embodiments, in a step 1110, a (e.g., subscription, request) message may be transmitted for subscribing to service data related to an application. According to embodiments, in a step 1120, a (e.g., subscription) response message may be received, identifying a plurality of WTRUs involved in the application. According to embodiments, in a step 1130, network data related to the WTRUs may be received. According to embodiments, in a step 1140, the service data related to the application may be received. The service data may comprise individual contribution metrics of the WTRUs to the QoE of the application, where an individual contribution metric of a WTRU may quantify an individual contribution of the WTRU to the QoE. According to embodiments, in a step 1150, data analytics associated with the application may be transmitted. The data analytics may be obtained based on, for example, the network data related to the WTRUs and on the individual contribution metrics of the WTRUs.

According to embodiments, an individual contribution metric of a WTRU may be received from a network element, different from that WTRU. For example, the network element may be executing an application function associated with the application.

According to embodiments, an individual contribution metric of a WTRU may be received from that WTRU.

According to embodiments, the network data related to the WTRUs may comprise any QoS metric related to WTRUs, that may be received, for example, from the WTRUs.

According to embodiments, any of a QoS metric related to a WTRU and an individual contribution metric of the WTRU may be received from the WTRU via minimization of drive test (MDT) based retrieval of information.

According to embodiments, a QoE model may be applied to any of the network data and the individual contribution metrics for obtaining the data analytics.

According to embodiments, the data analytics may comprise a QoE value of the application. According to embodiments, the data analytics may comprise a QoS configuration for the WTRUs, indicating how to configure the WTRUs for obtaining a target QoE value of the application. The QoS configuration may obtained, for example, based on the target QoE value.

According to embodiments, the target QoE value may be received from a requesting network element.

CONCLUSION

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

While not explicitly described, the present embodiments may be employed in any combination or sub-combination. For example, the present principles are not limited to the described variants, and any arrangement of variants and embodiments can be used. Moreover, the present principles are not limited to the described channel access methods and any other type of channel access methods is compatible with the present principles.

Besides, any characteristic, variant or embodiment described for a method is compatible with an apparatus device comprising means for processing the disclosed method, with a device comprising a processor configured to process the disclosed method, with a computer program product comprising program code instructions and with a non-transitory computer-readable storage medium storing program instructions.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer readable medium for execution by a computer or processor. Examples of non-transitory computer-readable storage media include, but are not limited to, a read only memory (ROM), random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU 102, UE, terminal, base station, RNC, or any host computer.

Moreover, in the embodiments described above, processing platforms, computing systems, controllers, and other devices containing processors are noted. These devices may contain at least one Central Processing Unit ("CPU") and memory. In accordance with the practices of persons skilled in the art of computer programming, reference to acts and symbolic representations of operations or instructions may be performed by the various CPUs and memories. Such acts and operations or instructions may be referred to as being "executed," "computer executed" or "CPU executed."

One of ordinary skill in the art will appreciate that the acts and symbolically represented operations or instructions include the manipulation of electrical signals by the CPU. An electrical system represents data bits that can cause a resulting transformation or reduction of the electrical signals and the maintenance of data bits at memory locations in a memory system to thereby reconfigure or otherwise alter the CPU's operation, as well as other processing of signals. The memory locations where data bits are maintained are physical locations that have particular electrical, magnetic, optical, or organic properties corresponding to or representative of the data bits. It should be understood that the representative embodiments are not limited to the above-mentioned platforms or CPUs and that other platforms and CPUs may support the provided methods.

The data bits may also be maintained on a computer readable medium including magnetic disks, optical disks, and any other volatile (e.g., Random Access Memory ("RAM")) or non-volatile (e.g., Read-Only Memory ("ROM")) mass storage system readable by the CPU. The computer readable medium may include cooperating or interconnected computer readable medium, which exist exclusively on the processing system or are distributed among multiple interconnected processing systems that may be local or remote to the processing system. It is understood that the representative embodiments are not limited to the above-mentioned memories and that other platforms and memories may support the described methods.

In an illustrative embodiment, any of the operations, processes, etc. described herein may be implemented as computer-readable instructions stored on a computer-readable medium. The computer-readable instructions may be executed by a processor of a mobile unit, a network element, and/or any other computing device.

There is little distinction left between hardware and software implementations of aspects of systems. The use of hardware or software is generally (e.g., but not always, in that in certain contexts the choice between hardware and software may become significant) a design choice represent- ing cost vs. efficiency tradeoffs. There may be various vehicles by which processes and/or systems and/or other technologies described herein may be effected (e.g., hard- ware, software, and/or firmware), and the preferred vehicle may vary with the context in which the processes and/or systems and/or other technologies are deployed. For example, if an implementer determines that speed and accuracy are paramount, the implementer may opt for a mainly hardware and/or firmware vehicle. If flexibility is paramount, the implementer may opt for a mainly software implementation. Alternatively, the implementer may opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be under- stood by those within the art that each function and/or operation within such block diagrams, flowcharts, or examples may be implemented, individually and/or collec- tively, by a wide range of hardware, software, firmware, or virtually any combination thereof. Suitable processors include, by way of example, a general purpose processor, a special purpose processor, a conventional processor, a digi- tal signal processor (DSP), a plurality of microprocessors, one or more microprocessors in association with a DSP core, a controller, a microcontroller, Application Specific Inte- grated Circuits (ASICs), Application Specific Standard Products (ASSPs); Field Programmable Gate Arrays (FP- GAs) circuits, any other type of integrated circuit (IC), and/or a state machine.

Although features and elements are provided above in particular combinations, one of ordinary skill in the art will appreciate that each feature or element can be used alone or in any combination with the other features and elements. The present disclosure is not to be limited in terms of the particular embodiments described in this application, which are intended as illustrations of various aspects. Many modi- fications and variations may be made without departing from its spirit and scope, as will be apparent to those skilled in the art. No element, act, or instruction used in the description of the present application should be construed as critical or essential to the invention unless explicitly provided as such. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods or sys- tems.

It is also to be understood that the terminology used herein is for the purpose of describing particular embodiments only and is not intended to be limiting. As used herein, when referred to herein, the terms "station" and its abbreviation "STA", "user equipment" and its abbreviation "UE" may mean (i) a wireless transmit and/or receive unit (WTRU), such as described infra; (ii) any of a number of embodiments of a WTRU, such as described infra; (iii) a wireless-capable and/or wired-capable (e.g., tetherable) device configured with, inter alia, some or all structures and functionality of a WTRU, such as described infra; (iii) a wireless-capable and/or wired-capable device configured with less than all structures and functionality of a WTRU, such as described infra; or (iv) the like. Details of an example WTRU, which may be representative of any UE recited herein, are provided below with respect to FIGS. 1A-1D.

In certain representative embodiments, several portions of the subject matter described herein may be implemented via Application Specific Integrated Circuits (ASICs), Field Pro- grammable Gate Arrays (FPGAs), digital signal processors (DSPs), and/or other integrated formats. However, those skilled in the art will recognize that some aspects of the embodiments disclosed herein, in whole or in part, may be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtu- ally any combination thereof, and that designing the cir- cuitry and/or writing the code for the software and or firmware would be well within the skill of one of skill in the art in light of this disclosure. In addition, those skilled in the art will appreciate that the mechanisms of the subject matter described herein may be distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a CD, a DVD, a digital tape, a computer memory, etc., and a transmission type medium such as a digital and/or an analog communication medium (e.g., a fiber optic cable, a waveguide, a wired communications link, a wireless com- munication link, etc.).

The herein described subject matter sometimes illustrates different components contained within, or connected with, different other components. It is to be understood that such depicted architectures are merely examples, and that in fact many other architectures may be implemented which achieve the same functionality. In a conceptual sense, any arrangement of components to achieve the same function- ality is effectively "associated" such that the desired func- tionality may be achieved. Hence, any two components herein combined to achieve a particular functionality may be seen as "associated with" each other such that the desired functionality is achieved, irrespective of architectures or intermediate components. Likewise, any two components so associated may also be viewed as being "operably con- nected", or "operably coupled", to each other to achieve the desired functionality, and any two components capable of being so associated may also be viewed as being "operably couplable" to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, where only one item is intended, the term "single" or similar language may be used. As an aid to understanding, the following appended claims and/or the descriptions herein may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"). The same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations).

Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B." Further, the terms "any of" followed by a listing of a plurality of items and/or a plurality of categories of items, as used herein, are intended to include "any of," "any combination of," "any multiple of," and/or "any combination of" multiples of the items and/or the categories of items, individually or in conjunction with other items and/or other categories of items. Moreover, as used herein, the term "set" or "group" is intended to include any number of items, including zero. Additionally, as used herein, the term "number" is intended to include any number, including zero.

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein may be readily broken down into a lower third, middle third and upper third, etc. As will also be understood by one skilled in the art all language such as "up to," "at least," "greater than," "less than," and the like includes the number recited and refers to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

Moreover, the claims should not be read as limited to the provided order or elements unless stated to that effect. In addition, use of the terms "means for" in any claim is intended to invoke 35 U.S.C. § 112, ¶6 or means-plus-function claim format, and any claim without the terms "means for" is not so intended.

A processor in association with software may be used to implement a radio frequency transceiver for use in a wireless transmit receive unit (WTRU), user equipment (UE), terminal, base station, Mobility Management Entity (MME) or Evolved Packet Core (EPC), or any host computer. The WTRU may be used m conjunction with modules, implemented in hardware and/or software including a Software Defined Radio (SDR), and other components such as a camera, a video camera module, a videophone, a speakerphone, a vibration device, a speaker, a microphone, a television transceiver, a hands free headset, a keyboard, a Bluetooth® module, a frequency modulated (FM) radio unit, a Near Field Communication (NFC) Module, a liquid crystal display (LCD) display unit, an organic light-emitting diode (OLED) display unit, a digital music player, a media player, a video game player module, an Internet browser, and/or any Wireless Local Area Network (WLAN) or Ultra Wide Band (UWB) module.

Although the invention has been described in terms of communication systems, it is contemplated that the systems may be implemented in software on microprocessors/general purpose computers (not shown). In certain embodiments, one or more of the functions of the various components may be implemented in software that controls a general-purpose computer.

In addition, although the invention is illustrated and described herein with reference to specific embodiments, the invention is not intended to be limited to the details shown. Rather, various modifications may be made in the details within the scope and range of equivalents of the claims and without departing from the invention.

What is claimed is:

1. A method implemented in a first network element, the method comprising:

receiving a first request message from a consumer network function, wherein the first request message indicates an and a type of requested analytics set to service experience;

transmitting a request message for subscribing to receive service experience data related to an application, wherein the application involves a plurality of wireless transmit and receive units (WTRUs);

receiving the service experience data related to the application, the service experience data comprising first information indicating the plurality of WTRUs involved in the application and individual contribution metrics of the plurality of WTRUs to a global quality of experience (QoE) of the application, wherein the individual contribution metrics of the plurality of WTRUs comprise service experience contribution weights of the plurality of WTRUs to the global QoE of the application;

determining, based on the first information, data analytics associated with the application; and transmitting the data analytics associated with the application.

2. The method of claim 1, wherein an individual contribution metric of a WTRU represents an individual contribution of the WTRU to the global QoE.

3. The method of claim 2, wherein the first information comprises an information element indicating the individual contribution metric of the WTRU and wherein the information element is received from the WTRU or from a second network element, different from the WTRU.

4. An apparatus comprising circuitry, including any of a transmitter, a receiver, a processor and a memory, configured to:

receive a first request message from a consumer network function, wherein the first request message indicates an application identifier and a type of requested analytics set to service experience;

transmit a request message for subscribing to receive service experience data related to an application, wherein the application involves a plurality of wireless transmit and receive units (WTRUs);

receive the service experience data related to the application, the service experience data comprising first information indicating the plurality of WTRUs involved in the application and individual contribution metrics of the plurality of WTRUs to a global quality of experience (QoE) of the application, wherein the individual contribution metrics of the plurality of WTRUs comprise service experience contribution weights of the plurality of WTRUs to the global QoE of the application;

determine, based on the first information, data analytics associated with the application; and transmit the data analytics associated with the application.

5. The apparatus of claim 4, wherein an individual contribution metric of a WTRU represents an individual contribution of the WTRU to the global QoE.

6. The apparatus of claim 5, wherein the first information comprises an information element indicating the individual contribution metric of the WTRU, and wherein the apparatus is configured to receive the information element from the WTRU or from a second network element, different from the WTRU.

7. The method of claim 1, wherein the global QoE of the application comprises a mean opinion score of the application.

8. The method of claim 1, wherein the first request message indicates a single network slice selection assistance information (S-NSSAI).

9. The method of claim 1, wherein transmitting the request message comprises transmitting the request message to an application function directly or via a network exposure function.

10. The method of claim 1, wherein receiving the service experience data comprises receiving the service experience data from an application function directly or via a network exposure function.

11. The method of claim 1, wherein the data analytics comprise a QoE value of the application.

12. The apparatus of claim 4, wherein the global QoE of the application comprises a mean opinion score of the application.

13. The apparatus of claim 4, wherein the first request message indicates a single network slice selection assistance information (S-NSSAI).

14. The apparatus of claim 4, wherein being configured to transmit the request message for subscribing to receive service experience data related to an application comprises being configured to transmit the request message to an application function directly or via a network exposure function.

15. The apparatus of claim 4, wherein being configured to receive the service experience data comprises being configured to receive the service experience data from an application function directly or via a network exposure function.

16. The apparatus of claim 4, wherein the data analytics comprise a QoE value of the application.

* * * * *